(12) United States Patent
Wang et al.

(10) Patent No.: US 11,921,234 B2
(45) Date of Patent: Mar. 5, 2024

(54) ATTACHING A GLASS MIRROR TO A ROTATING METAL MOTOR FRAME

(71) Applicant: Innovusion Ireland Limited, Los Altos, CA (US)

(72) Inventors: Ning-Yi Wang, Fremont, CA (US); Haosen Wang, Sunnyvale, CA (US)

(73) Assignee: INNOVUSION, INC., Sunnyvale, CA (US)

( * ) Notice: Subject to any disclaimer, the term of this patent is extended or adjusted under 35 U.S.C. 154(b) by 9 days.

(21) Appl. No.: 17/590,785

(22) Filed: Feb. 1, 2022

(65) Prior Publication Data

US 2022/0260686 A1 Aug. 18, 2022

Related U.S. Application Data

(60) Provisional application No. 63/150,079, filed on Feb. 16, 2021.

(51) Int. Cl.
*G01S 7/481* (2006.01)
*G01S 17/10* (2020.01)
*G01S 17/931* (2020.01)

(52) U.S. Cl.
CPC ............ *G01S 7/4817* (2013.01); *G01S 17/10* (2013.01); *G01S 17/931* (2020.01)

(58) Field of Classification Search
None
See application file for complete search history.

(56) References Cited

U.S. PATENT DOCUMENTS 3,897,150 A 7/1975 Bridges et al.
4,464,048 A 8/1984 Farlow
(Continued)

FOREIGN PATENT DOCUMENTS

CN 1677050 A 10/2005
CN 204758260 U 11/2015
(Continued)

OTHER PUBLICATIONS https://www.globalspec.com/industrial-directory/90_durometer_rubber (Year: 2011).*
(Continued)

*Primary Examiner* — Yuqing Xiao
*Assistant Examiner* — Jempson Noel
(74) *Attorney, Agent, or Firm* — MASCHOFF BRENNAN; Ran Pang; Liang Huang

(57) ABSTRACT

A rotatable optical reflector device of a Light Detection and Ranging (LiDAR) scanning system used in a motor vehicle is disclosed. The rotatable optical reflector device comprises a glass-based optical reflector including a plurality of reflective surfaces and a flange. The rotatable optical reflector device further comprises a metal-based motor rotor body at least partially disposed in an inner opening of the glass-based optical reflector. The rotatable optical reflector device further comprises an elastomer piece having a first surface and a second surface. The first surface of the elastomer piece is in contact with a second mounting surface of the flange. The rotatable optical reflector device further comprises a clamping mechanism compressing the elastomer piece at the second surface of the elastomer piece, wherein movement of the metal-based motor rotor body causes the glass-based optical reflector to optically scan light in a field-of-view of the LiDAR scanning system.

26 Claims, 11 Drawing Sheets

(56) References Cited

U.S. PATENT DOCUMENTS

| | | |
|---|---|---|
| 5,006,721 A | 4/1991 | Cameron et al. |
| 5,012,079 A | 4/1991 | Singh et al. |
| 5,157,451 A | 10/1992 | Taboada et al. |
| 5,319,434 A | 6/1994 | Croteau et al. |
| 5,369,661 A | 11/1994 | Yamaguchi et al. |
| 5,442,358 A | 8/1995 | Keeler et al. |
| 5,546,188 A | 8/1996 | Wangler et al. |
| 5,579,153 A | 11/1996 | Laming et al. |
| 5,657,077 A | 8/1997 | Deangelis et al. |
| 5,793,491 A | 8/1998 | Wangler et al. |
| 5,838,239 A | 11/1998 | Stern et al. |
| 5,864,391 A | 1/1999 | Hosokawa et al. |
| 5,926,259 A | 7/1999 | Bamberger et al. |
| 5,936,756 A | 8/1999 | Nakajima |
| 5,942,824 A | 8/1999 | Shioya et al. |
| 5,969,844 A * | 10/1999 | Itami .................. G02B 26/121 359/198.1 |
| 6,087,749 A * | 7/2000 | Ishizuka .............. G02B 26/121 384/100 |
| 6,163,378 A | 12/2000 | Khoury |
| 6,317,202 B1 | 11/2001 | Hosokawa et al. |
| 6,594,000 B2 | 7/2003 | Green et al. |
| 6,650,404 B1 | 11/2003 | Crawford |
| 6,950,733 B2 | 9/2005 | Stopczynski |
| 7,128,267 B2 | 10/2006 | Reichenbach et al. |
| 7,202,941 B2 | 4/2007 | Munro |
| 7,345,271 B2 | 3/2008 | Boehlau et al. |
| 7,440,084 B2 | 10/2008 | Kane |
| 7,440,175 B2 | 10/2008 | Di et al. |
| 7,489,865 B2 | 2/2009 | Varshineya et al. |
| 7,576,837 B2 | 8/2009 | Liu et al. |
| 7,602,540 B2 | 10/2009 | Masuda et al. |
| 7,830,527 B2 | 11/2010 | Chen et al. |
| 7,835,068 B1 | 11/2010 | Brooks et al. |
| 7,847,235 B2 | 12/2010 | Krupkin et al. |
| 7,880,865 B2 | 2/2011 | Tanaka et al. |
| 7,936,448 B2 | 5/2011 | Albuquerque et al. |
| 7,969,558 B2 | 6/2011 | Hall |
| 7,982,861 B2 | 7/2011 | Abshire et al. |
| 8,072,582 B2 | 12/2011 | Meneely |
| 8,471,895 B2 | 6/2013 | Banks |
| 8,736,818 B2 | 5/2014 | Weimer et al. |
| 8,749,764 B2 | 6/2014 | Hsu |
| 8,812,149 B2 | 8/2014 | Doak |
| 8,994,928 B2 | 3/2015 | Shiraishi |
| 9,048,616 B1 | 6/2015 | Robinson |
| 9,065,243 B2 | 6/2015 | Asobe et al. |
| 9,086,273 B1 | 7/2015 | Gruver et al. |
| 9,194,701 B2 | 11/2015 | Bosch |
| 9,255,790 B2 | 2/2016 | Zhu |
| 9,300,321 B2 | 3/2016 | Zalik et al. |
| 9,304,316 B2 | 4/2016 | Weiss et al. |
| 9,316,724 B2 | 4/2016 | Gehring et al. |
| 9,354,485 B2 | 5/2016 | Fermann et al. |
| 9,510,505 B2 | 12/2016 | Halloran et al. |
| 9,575,184 B2 | 2/2017 | Gilliland et al. |
| 9,605,998 B2 | 3/2017 | Nozawa |
| 9,621,876 B2 | 4/2017 | Federspiel |
| 9,638,799 B2 | 5/2017 | Goodwin et al. |
| 9,696,426 B2 | 7/2017 | Zuk |
| 9,702,966 B2 | 7/2017 | Batcheller et al. |
| 9,804,264 B2 | 10/2017 | Villeneuve et al. |
| 9,810,786 B1 | 11/2017 | Welford et al. |
| 9,812,838 B2 | 11/2017 | Villeneuve et al. |
| 9,823,353 B2 | 11/2017 | Eichenholz et al. |
| 9,857,468 B1 | 1/2018 | Eichenholz et al. |
| 9,869,754 B1 | 1/2018 | Campbell et al. |
| 9,880,263 B2 | 1/2018 | Droz et al. |
| 9,880,278 B2 | 1/2018 | Uffelen et al. |
| 9,885,778 B2 | 2/2018 | Dussan |
| 9,897,689 B2 | 2/2018 | Dussan |
| 9,915,726 B2 | 3/2018 | Bailey et al. |
| 9,927,915 B2 | 3/2018 | Frame et al. |
| 9,958,545 B2 | 5/2018 | Eichenholz et al. |
| 10,007,001 B1 | 6/2018 | LaChapelle et al. |
| 10,012,732 B2 | 7/2018 | Eichenholz et al. |
| 10,042,159 B2 | 8/2018 | Dussan et al. |
| 10,061,019 B1 | 8/2018 | Campbell et al. |
| 10,073,166 B2 | 9/2018 | Dussan |
| 10,078,133 B2 | 9/2018 | Dussan |
| 10,094,925 B1 | 10/2018 | LaChapelle |
| 10,157,630 B2 | 12/2018 | Vaughn et al. |
| 10,191,155 B2 | 1/2019 | Curatu |
| 10,215,847 B2 | 2/2019 | Scheim et al. |
| 10,267,898 B2 | 4/2019 | Campbell et al. |
| 10,295,656 B1 | 5/2019 | Li et al. |
| 10,310,058 B1 | 6/2019 | Campbell et al. |
| 10,324,170 B1 | 6/2019 | Enberg, Jr. et al. |
| 10,324,185 B2 | 6/2019 | McWhirter et al. |
| 10,393,877 B2 | 8/2019 | Hall et al. |
| 10,429,495 B1 | 10/2019 | Wang et al. |
| 10,444,356 B2 | 10/2019 | Wu et al. |
| 10,451,716 B2 | 10/2019 | Hughes et al. |
| 10,466,342 B1 | 11/2019 | Zhu et al. |
| 10,472,111 B2 | 11/2019 | Li |
| 10,502,831 B2 | 12/2019 | Eichenholz |
| 10,509,112 B1 | 12/2019 | Pan |
| 10,520,602 B2 | 12/2019 | Villeneuve et al. |
| 10,557,923 B2 | 2/2020 | Watnik et al. |
| 10,571,567 B2 | 2/2020 | Campbell et al. |
| 10,578,720 B2 | 3/2020 | Hughes et al. |
| 10,591,600 B2 | 3/2020 | Villeneuve et al. |
| 10,627,491 B2 | 4/2020 | Hall et al. |
| 10,641,872 B2 | 5/2020 | Dussan et al. |
| 10,663,564 B2 | 5/2020 | LaChapelle |
| 10,663,585 B2 | 5/2020 | McWhirter |
| 10,663,596 B2 | 5/2020 | Dussan et al. |
| 10,684,360 B2 | 6/2020 | Campbell |
| 10,908,262 B2 | 2/2021 | Dussan |
| 10,908,265 B2 | 2/2021 | Dussan |
| 10,908,268 B2 | 2/2021 | Zhou et al. |
| 10,969,475 B2 | 4/2021 | Li et al. |
| 10,983,218 B2 | 4/2021 | Hall et al. |
| 11,002,835 B2 | 5/2021 | Pan et al. |
| 11,009,605 B2 | 5/2021 | Li et al. |
| 11,194,048 B1 | 12/2021 | Burbank et al. |
| 11,237,253 B2 | 2/2022 | Galloway et al. |
| 2002/0136251 A1 | 9/2002 | Green et al. |
| 2004/0135992 A1 | 7/2004 | Munro |
| 2004/0233492 A1 * | 11/2004 | Matsui .................. G02B 26/121 359/221.3 |
| 2005/0033497 A1 | 2/2005 | Stopczynski |
| 2005/0190424 A1 | 9/2005 | Reichenbach et al. |
| 2005/0195383 A1 | 9/2005 | Breed et al. |
| 2006/0071846 A1 | 4/2006 | Yanagisawa et al. |
| 2006/0132752 A1 | 6/2006 | Kane |
| 2007/0091948 A1 | 4/2007 | Di et al. |
| 2007/0216995 A1 | 9/2007 | Bollond et al. |
| 2008/0084611 A1 | 4/2008 | Gardner et al. |
| 2008/0174762 A1 | 7/2008 | Liu et al. |
| 2008/0193135 A1 | 8/2008 | Du et al. |
| 2008/0259430 A1 * | 10/2008 | Fukushima ........ G02B 27/0006 359/216.1 |
| 2009/0010644 A1 | 1/2009 | Varshneya et al. |
| 2009/0051926 A1 | 2/2009 | Chen |
| 2009/0059201 A1 | 3/2009 | Willner et al. |
| 2009/0067453 A1 | 3/2009 | Mizuuchi et al. |
| 2009/0147239 A1 | 6/2009 | Zhu |
| 2009/0262760 A1 | 10/2009 | Krupkin et al. |
| 2009/0316134 A1 | 12/2009 | Michael et al. |
| 2010/0006760 A1 | 1/2010 | Lee et al. |
| 2010/0020306 A1 | 1/2010 | Hall |
| 2010/0020377 A1 | 1/2010 | Brochers et al. |
| 2010/0027602 A1 | 2/2010 | Abshire et al. |
| 2010/0045965 A1 | 2/2010 | Meneely |
| 2010/0053715 A1 | 3/2010 | O'Neill et al. |
| 2010/0091083 A1 * | 4/2010 | Itami .................. G02B 27/0006 347/261 |
| 2010/0128109 A1 | 5/2010 | Banks |
| 2010/0271614 A1 | 10/2010 | Albuquerque et al. |
| 2011/0181864 A1 | 7/2011 | Schmitt et al. |
| 2012/0038903 A1 | 2/2012 | Weimer et al. |
| 2012/0124113 A1 | 5/2012 | Zalik et al. |
| 2012/0221142 A1 | 8/2012 | Doak |

(56) References Cited

U.S. PATENT DOCUMENTS

| | | |
|---|---|---|
| 2013/0107016 A1 | 5/2013 | Federspeil |
| 2013/0116971 A1 | 5/2013 | Retkowski et al. |
| 2013/0241761 A1 | 9/2013 | Cooper et al. |
| 2013/0293867 A1 | 11/2013 | Hsu et al. |
| 2013/0293946 A1 | 11/2013 | Fermann et al. |
| 2013/0329279 A1 | 12/2013 | Nati et al. |
| 2013/0342822 A1 | 12/2013 | Shiraishi |
| 2014/0078514 A1 | 3/2014 | Zhu |
| 2014/0104594 A1 | 4/2014 | Gammenthaler |
| 2014/0347650 A1 | 11/2014 | Bosch |
| 2014/0350836 A1 | 11/2014 | Stettner et al. |
| 2015/0078123 A1 | 3/2015 | Batcheller et al. |
| 2015/0084805 A1 | 3/2015 | Dawber |
| 2015/0109603 A1 | 4/2015 | Kim et al. |
| 2015/0116692 A1 | 4/2015 | Zuk et al. |
| 2015/0139259 A1 | 5/2015 | Robinson |
| 2015/0158489 A1 | 6/2015 | Oh et al. |
| 2015/0338270 A1 | 11/2015 | Williams et al. |
| 2015/0355327 A1 | 12/2015 | Goodwin et al. |
| 2015/0378153 A1* | 12/2015 | Kodani ............... G02B 26/127 310/75 R |
| 2016/0003946 A1 | 1/2016 | Gilliland et al. |
| 2016/0047896 A1 | 2/2016 | Dussan |
| 2016/0047900 A1 | 2/2016 | Dussan |
| 2016/0061655 A1 | 3/2016 | Nozawa |
| 2016/0061935 A1 | 3/2016 | Mccloskey et al. |
| 2016/0100521 A1 | 4/2016 | Halloran et al. |
| 2016/0117048 A1 | 4/2016 | Frame et al. |
| 2016/0172819 A1 | 6/2016 | Ogaki |
| 2016/0178736 A1 | 6/2016 | Chung |
| 2016/0219177 A1* | 7/2016 | Otoguro ............... H04N 1/113 |
| 2016/0226210 A1 | 8/2016 | Zayhowski et al. |
| 2016/0245902 A1 | 8/2016 | Natnik |
| 2016/0291134 A1 | 10/2016 | Droz et al. |
| 2016/0313445 A1 | 10/2016 | Bailey et al. |
| 2016/0327646 A1 | 11/2016 | Scheim et al. |
| 2017/0003116 A1 | 1/2017 | Yee et al. |
| 2017/0153319 A1 | 6/2017 | Villeneuve et al. |
| 2017/0242104 A1 | 8/2017 | Dussan |
| 2017/0299721 A1 | 10/2017 | Eichenholz et al. |
| 2017/0307738 A1 | 10/2017 | Schwarz et al. |
| 2017/0365105 A1 | 12/2017 | Rao et al. |
| 2018/0040171 A1 | 2/2018 | Kundu et al. |
| 2018/0050704 A1 | 2/2018 | Tascione et al. |
| 2018/0069367 A1 | 3/2018 | Villeneuve et al. |
| 2018/0152691 A1 | 5/2018 | Pacala et al. |
| 2018/0158471 A1 | 6/2018 | Vaughn et al. |
| 2018/0164439 A1 | 6/2018 | Droz et al. |
| 2018/0156896 A1 | 7/2018 | O'Keeffe |
| 2018/0188355 A1 | 7/2018 | Bao et al. |
| 2018/0188357 A1 | 7/2018 | Li et al. |
| 2018/0188358 A1 | 7/2018 | Li et al. |
| 2018/0188371 A1 | 7/2018 | Bao et al. |
| 2018/0210084 A1 | 7/2018 | Zwölfer et al. |
| 2018/0275274 A1 | 9/2018 | Bao et al. |
| 2018/0284241 A1 | 10/2018 | Campbell et al. |
| 2018/0284242 A1 | 10/2018 | Campbell |
| 2018/0284286 A1 | 10/2018 | Eichenholz et al. |
| 2018/0329060 A1 | 11/2018 | Pacala et al. |
| 2018/0359460 A1 | 12/2018 | Pacala et al. |
| 2019/0025428 A1 | 1/2019 | Li et al. |
| 2019/0107607 A1 | 4/2019 | Danziger |
| 2019/0107623 A1 | 4/2019 | Campbell et al. |
| 2019/0120942 A1 | 4/2019 | Zhang et al. |
| 2019/0120962 A1 | 4/2019 | Gimpel et al. |
| 2019/0154804 A1 | 5/2019 | Eichenholz |
| 2019/0154807 A1 | 5/2019 | Steinkogler et al. |
| 2019/0154816 A1* | 5/2019 | Hughes ............... G01S 7/497 |
| 2019/0212416 A1 | 7/2019 | Li et al. |
| 2019/0250254 A1 | 8/2019 | Campbell et al. |
| 2019/0257924 A1 | 8/2019 | Li et al. |
| 2019/0265334 A1 | 8/2019 | Zhang et al. |
| 2019/0265336 A1 | 8/2019 | Zhang et al. |
| 2019/0265337 A1 | 8/2019 | Zhang et al. |
| 2019/0265339 A1 | 8/2019 | Zhang et al. |
| 2019/0277952 A1 | 9/2019 | Beuschel et al. |
| 2019/0310351 A1* | 10/2019 | Hughes ............... G01S 7/4817 |
| 2019/0310368 A1 | 10/2019 | LaChapelle |
| 2019/0369215 A1 | 12/2019 | Wang et al. |
| 2019/0369258 A1 | 12/2019 | Hall et al. |
| 2019/0383915 A1 | 12/2019 | Li et al. |
| 2020/0142070 A1 | 5/2020 | Hall et al. |
| 2020/0217936 A1 | 7/2020 | Galloway et al. |
| 2020/0256964 A1 | 8/2020 | Campbell et al. |
| 2020/0284906 A1 | 9/2020 | Eichenholz et al. |
| 2020/0319310 A1 | 10/2020 | Hall et al. |
| 2020/0400798 A1 | 12/2020 | Rezk et al. |
| 2021/0088630 A9 | 3/2021 | Zhang |
| 2022/0260686 A1 | 8/2022 | Wang et al. |

FOREIGN PATENT DOCUMENTS

| | | |
|---|---|---|
| CN | 204885804 U | 12/2015 |
| CN | 105281525 A | 1/2016 |
| CN | 105518511 A | 4/2016 |
| CN | 108132472 A | 6/2018 |
| CN | 207457508 U | 6/2018 |
| CN | 207557465 U | 6/2018 |
| CN | 208314210 U | 1/2019 |
| CN | 208421228 U | 1/2019 |
| CN | 208705506 U | 4/2019 |
| CN | 106597471 B | 5/2019 |
| CN | 209280923 U | 8/2019 |
| CN | 108445468 B | 11/2019 |
| CN | 110031823 B | 3/2020 |
| CN | 108089201 B | 4/2020 |
| CN | 109116331 B | 4/2020 |
| CN | 109917408 8 | 4/2020 |
| CN | 109116366 B | 5/2020 |
| CN | 109116367 B | 5/2020 |
| CN | 110031822 B | 5/2020 |
| CN | 211655309 U | 10/2020 |
| CN | 109188397 B | 11/2020 |
| CN | 109814086 B | 11/2020 |
| CN | 109917348 B | 11/2020 |
| CN | 110492856 B | 11/2020 |
| CN | 110736975 B | 11/2020 |
| CN | 109725320 B | 12/2020 |
| CN | 110780284 B | 12/2020 |
| CN | 110780283 B | 1/2021 |
| CN | 110784220 B | 2/2021 |
| CN | 212623082 U | 2/2021 |
| CN | 110492349 B | 3/2021 |
| CN | 109950784 B | 5/2021 |
| CN | 213182011 U | 5/2021 |
| CN | 213750313 U | 7/2021 |
| CN | 214151038 U | 9/2021 |
| CN | 109814082 B | 10/2021 |
| CN | 113491043 A | 10/2021 |
| CN | 214795200 U | 11/2021 |
| CN | 214795206 U | 11/2021 |
| CN | 214895784 U | 11/2021 |
| CN | 214895810 U | 11/2021 |
| CN | 215641806 U | 1/2022 |
| CN | 112639527 B | 2/2022 |
| CN | 215932142 U | 3/2022 |
| CN | 112578396 B | 4/2022 |
| DE | 10 2014 000 987 A1 | 7/2014 |
| EP | 0 757 257 A2 | 2/1997 |
| EP | 1 237 305 A2 | 9/2002 |
| EP | 1 923 721 A1 | 5/2008 |
| EP | 2 157 445 A2 | 2/2010 |
| EP | 2 395 368 A1 | 12/2011 |
| EP | 2 889 642 A1 | 7/2015 |
| EP | 3905006 A1 | 11/2021 |
| GB | 1 427 164 A | 3/1976 |
| GB | 2000411 | 1/1979 |
| JP | 2002107851 A | 4/2002 |
| JP | 2005114801 A | 4/2005 |
| JP | 2007144667 A | 6/2007 |
| JP | 2010035385 A | 2/2010 |
| JP | 2017-003347 A | 1/2017 |
| JP | 2017-138301 A | 8/2017 |
| KR | 10-2012-0013515 A | 2/2012 |

(56) References Cited

FOREIGN PATENT DOCUMENTS

| | | |
|---|---|---|
| KR | 10-2013-0068224 A | 6/2013 |
| KR | 10-2018-0107673 A | 10/2018 |
| KR | 10-2020-0059426 A | 5/2020 |
| WO | 2017/110417 A1 | 6/2017 |
| WO | 2018/125725 A1 | 7/2018 |
| WO | 2018/129410 A1 | 7/2018 |
| WO | 2018129408 A1 | 7/2018 |
| WO | 2018129409 A1 | 7/2018 |
| WO | 2018129410 A1 | 7/2018 |
| WO | 2018175990 | 9/2018 |
| WO | 2018182812 A2 | 10/2018 |
| WO | 2019079642 | 4/2019 |
| WO | 2019165095 | 8/2019 |
| WO | 2019165289 A1 | 8/2019 |
| WO | 2019165294 | 8/2019 |
| WO | 2020013890 A2 | 1/2020 |
| WO | 2021251058 A1 | 12/2021 |
| WO | 2022/177794 A1 | 8/2022 |

OTHER PUBLICATIONS

International Search Report and Written Opinion issued in International Application No. PCT/US22/15875 dated Jun. 28, 2022, 9 pages.
"Mirrors", Physics LibreTexts, https://phys.libretexts.org/Bookshelves/Optics/Supplemental_Modules_(Components)/Mirrors, (2021), 2 pages.
"Why Wavelengths Matter in Fiber Optics", FirstLight, https://www.firstlight.net/why-wavelengths-matter-in-fiber-optics/, (2021), 5 pages.
Chen, X, et al. (Feb. 2010). "Polarization Coupling of Light and Optoelectronics Devices Based on Periodically Poled Lithium Niobate," Shanghai Jiao Tong University, China, Frontiers in Guided Wave Optics and Optoelectronics, 24 pages.
Goldstein, R. (Apr. 1986) "Electro-Optic Devices in Review, The Linear Electro-Optic (Pockels) Effect Forms the Basis for a Family of Active Devices," Laser & Applications, FastPulse Technology, Inc., 6 pages.
International Preliminary Report on Patentability, dated Jul. 9, 2019, for International Application No. PCT/US2018/012703, 10 pages.
International Preliminary Report on Patentability, dated Jul. 9, 2019, for International Application No. PCT/US2018/012704, 7 pages.
International Preliminary Report on Patentability, dated Jul. 9, 2019, for International Application No. PCT/US2018/012705, 7 pages.
International Search Report and Written Opinion, dated Jan. 17, 2020, for International Application No. PCT/US2019/019276, 14 pages.
International Search Report and Written Opinion, dated Jul. 9, 2019, for International Application No. PCT/US2019/018987, 17 pages.
International Search Report and Written Opinion, dated Sep. 18, 2018, for International Application No. PCT/US2018/012116, 12 pages.
International Search Report and Written Opinion, dated May 3, 2019, for International Application No. PCT/US2019/019272, 16 pages.
International Search Report and Written Opinion, dated May 6, 2019, for International Application No. PCT/US2019/019264, 15 pages.
International Search Report and Written Opinion, dated Jan. 3, 2019, for International Application No. PCT/US2018/056577, 15 pages.
International Search Report and Written Opinion, dated Mar. 23, 2018, for International Application No. PCT/US2018/012704, 12 pages.
International Search Report and Written Opinion, dated Jun. 7, 2018, for International Application No. PCT/US2018/024185, 9 pages.
International Preliminary Report on Patentability, dated Apr. 30, 2020, for International Application No. PCT/US2018/056577, 8 pages.
European Search Report, dated Jul. 17, 2020, for EP Application No. 18776977.3, 12 pages.
Extended European Search Report, dated Jul. 10, 2020, for EP Application No. 18736738.8, 9 pages.
Gunzung, Kim, et al. (Mar. 2, 2016). "A hybrid 3D LIDAR imager based on pixel-by-pixel scanning and DS-OCDMA," pages Proceedings of SPIE [Proceedings of SPIE ISSN 0277-786X vol. 10524], SPIE, US, vol. 9751, pp. 975119-975119-8.
Extended European Search Report, dated Jul. 22, 2020, for EP Application No. 18736685.1, 10 pages.
Gluckman, J. (May 13, 2016). "Design of the processing chain for a high-altitude, airborne, single-photon lidar mapping instrument," Proceedings of SPIE; [Proceedings of SPIE ISSN 0277-786X vol. 10524], SPIE, US, vol. 9832, 9 pages.
Office Action Issued in Japanese Patent Application No. 2019-536019 dated Nov. 30, 2021, 6 pages.
European Search Report, dated Jun. 17, 2021, for EP Application No. 18868896.4, 7 pages.
"Fiber laser," Wikipedia, https://en.wikipedia.org/wiki/Fiber_laser, 6 pages.
International Search Report and Written Opinion, dated Mar. 19, 2018, for International Application No. PCT/US2018/012705, 12 pages.
International Search Report and Written Opinion, dated Mar. 20, 2018, for International Application No. PCT/US2018/012703, 13 pages.
Office Action Issued in Chinese Patent Application No. 202280003840.6 dated May 18, 2023, 16 pages.
Office Action issued in Korean Application No. 10-2022-7043083 dated Apr. 13, 2023, 16 pages.
Office Action Issued in Japanese Patent Application No. 2022-570665 dated Jul. 21, 2023, 14 pages.
International Search Report and Written Opinion issued in International Application No. PCT/US2022/028866 dated Sep. 6, 2022, 13 pages.
Notice of Preliminary Rejection dated Oct. 5, 2023 for KR Application No. 10-2022-7043083, 20 pages.

* cited by examiner

ATTACHING A GLASS MIRROR TO A ROTATING METAL MOTOR FRAME

CROSS-REFERENCE TO RELATED APPLICATIONS

This application claims priority to U.S. Provisional Patent Application Ser. No. 63/150,079, filed Feb. 16, 2021, entitled "ATTACHING A GLASS MIRROR TO A ROTATING METAL MOTOR FRAME," the content of which is hereby incorporated by reference for all purposes.

FIELD

This disclosure relates generally to light detection and ranging (LiDAR) systems and methods and, more particularly, to a rotatable optical reflector device of a LiDAR system.

BACKGROUND

Light detection and ranging (LiDAR) systems use light pulses to create an image or point cloud of the external environment. Some typical LiDAR systems include a light source, a light transmitter, a light steering system, and a light detector. The light source generates a light beam that is directed by the light steering system in particular directions when being transmitted from the LiDAR system. When a transmitted light beam is scattered by an object, a portion of the scattered light returns to the LiDAR system as a return light pulse. The light detector detects the return light pulse. Using the difference between the time that the return light pulse is detected and the time that a corresponding light pulse in the light beam is transmitted, the LiDAR system can determine the distance to the object using the speed of light. The light steering system can direct light beams along different paths to allow the LiDAR system to scan the surrounding environment and produce images or point clouds. LiDAR systems can also use techniques other than time-of-flight and scanning to measure the surrounding environment.

SUMMARY

A LiDAR system is often an essential component of a motor vehicle. A LiDAR system may include a polygon mirror and a motor rotor body for rotating the polygon mirror. Because the materials used for the polygon mirror and the motor rotor body are different, there is a mismatch of coefficients of thermal expansion (CTE) between the glass-based polygon mirror and the metal-based motor rotor body. When there is a temperature variation, the CTE mismatch may cause undesired pressure and/or stress to occur between the glass-based polygon mirror and the metal-based motor rotor body. The pressure and/or stress may also be uneven at different parts of the polygon mirror. Furthermore, in addition to a temperature variation, the LiDAR system may also be subject to shock and vibration conditions when the motor vehicle operates. One or more of the temperature variations, shock conditions, and vibration conditions may cause the polygon mirror to malfunction, underperform (e.g., the polygon mirror may wobble), or even become damaged (e.g., fractured). This may in turn affect the overall performance of the LiDAR system. Thus, there is a need to eliminate or reduce the impact caused by these conditions.

Embodiments of the present disclosure use an elastomer piece configured to absorb the stress caused by the various environmental conditions (e.g., temperature variation, vibration, and shock), thereby reducing the likelihood that the polygon mirror may malfunction, underperform, and/or become damaged. Embodiments of the present disclosure further use fastening mechanisms configured to apply proper compression forces to the elastomer piece. The fastening mechanisms may be fine-tuned to apply desired compression force to different portions of the elastomer pieces. As a result, wobbling of the polygon mirror can be eliminated or substantially reduced by such fine tuning of the compression forces. Various embodiments of the present disclosure are described in more detail below.

In one embodiment, a rotatable optical reflector device of a Light Detection and Ranging (LiDAR) scanning system used in a motor vehicle is provided. The rotatable optical reflector device comprises a glass-based optical reflector including a plurality of reflective surfaces and a flange. The rotatable optical reflector device further comprises a metal-based motor rotor body at least partially disposed in an inner opening of the glass-based optical reflector. The flange extends from an inner sidewall of the glass-based optical reflector towards the metal-based motor rotor body. The flange includes a first mounting surface that is in contact with a reference surface of the metal-based motor rotor body. The rotatable optical reflector device further comprises an elastomer piece having a first surface and a second surface. The first surface of the elastomer piece is in contact with a second mounting surface of the flange. The rotatable optical reflector device further comprises a clamping mechanism compressing the elastomer piece at the second surface of the elastomer piece, wherein movement of the metal-based motor rotor body causes the glass-based optical reflector to optically scan light in a field-of-view of the LiDAR scanning system.

In one embodiment, a Light Detection and Ranging (LiDAR) system used in a motor vehicle is provided. The LiDAR system comprises a rotatable optical reflector device. The rotatable optical reflector device comprises a glass-based optical reflector including a plurality of reflective surfaces and a flange. The rotatable optical reflector device further comprises a metal-based motor rotor body at least partially disposed in an inner opening of the glass-based optical reflector. The flange extends from an inner sidewall of the glass-based optical reflector towards the metal-based motor rotor body. The flange includes a first mounting surface that is in contact with a reference surface of the metal-based motor rotor body. The rotatable optical reflector device further comprises an elastomer piece having a first surface and a second surface. The first surface of the elastomer piece is in contact with a second mounting surface of the flange. The rotatable optical reflector device further comprises a clamping mechanism compressing the elastomer piece at the second surface of the elastomer piece, wherein movement of the metal-based motor rotor body causes the glass-based optical reflector to optically scan light in a field-of-view of the LiDAR scanning system.

In one embodiment, a motor vehicle is provided. The motor vehicle comprises a Light Detection and Ranging (LiDAR) system that comprises a rotatable optical reflector device. The rotatable optical reflector device comprises a glass-based optical reflector including a plurality of reflective surfaces and a flange. The rotatable optical reflector device further comprises a metal-based motor rotor body at least partially disposed in an inner opening of the glass-based optical reflector. The flange extends from an inner sidewall of the glass-based optical reflector towards the metal-based motor rotor body. The flange includes a first mounting surface that is in contact with a reference surface of the metal-based motor rotor body. The rotatable optical reflector device further comprises an elastomer piece having a first surface and a second surface. The first surface of the elastomer piece is in contact with a second mounting surface of the flange. The rotatable optical reflector device further comprises a clamping mechanism compressing the elastomer piece at the second surface of the elastomer piece, wherein movement of the metal-based motor rotor body causes the glass-based optical reflector to optically scan light in a field-of-view of the LiDAR scanning system.

BRIEF DESCRIPTION OF THE DRAWINGS

The present application can be best understood by reference to the figures described below taken in conjunction with the accompanying drawing figures, in which like parts may be referred to by like numerals.

DETAILED DESCRIPTION

Figure 1:
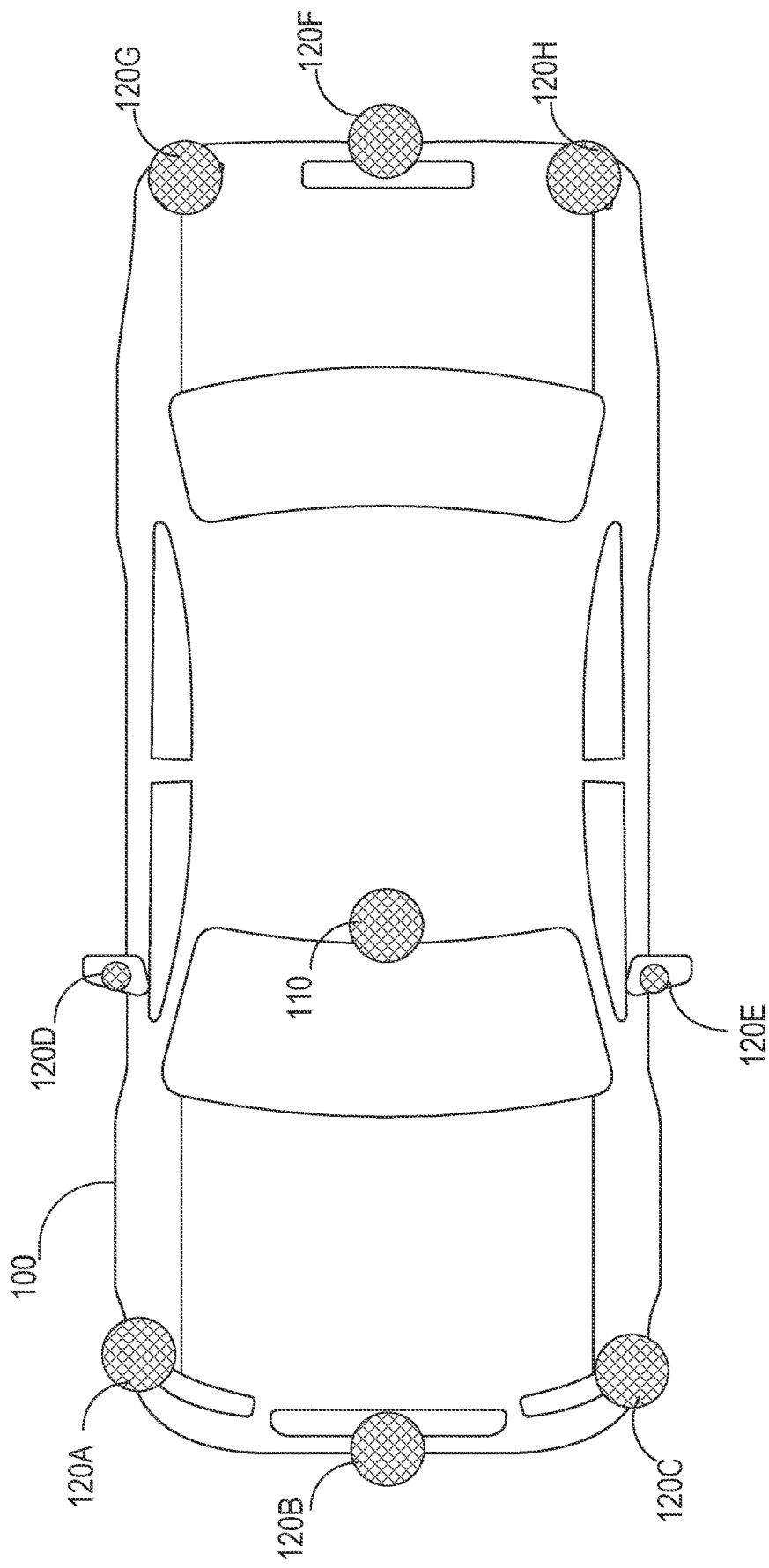
FIG. 1 illustrates one or more exemplary LiDAR systems disposed or included in a motor vehicle.

To provide a more thorough understanding of the present disclosure, the following description sets forth numerous specific details, such as specific configurations, parameters, examples, and the like. It should be recognized, however, that such description is not intended as a limitation on the scope of the present disclosure but is intended to provide a better description of the exemplary embodiments.

Throughout the specification and claims, the following terms take the meanings explicitly associated herein, unless the context clearly dictates otherwise:

The phrase "in one embodiment" as used herein does not necessarily refer to the same embodiment, though it may. Thus, as described below, various embodiments of the disclosure may be readily combined, without departing from the scope or spirit of the invention.

As used herein, the term "or" is an inclusive "or" operator and is equivalent to the term "and/or," unless the context clearly dictates otherwise.

The term "based on" is not exclusive and allows for being based on additional factors not described unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of a networked environment where two or more components or devices are able to exchange data, the terms "coupled to" and "coupled with" are also used to mean "communicatively coupled with", possibly via one or more intermediary devices.

Although the following description uses terms "first," "second," etc. to describe various elements, these elements should not be limited by the terms. These terms are only used to distinguish one element from another. For example, a first surface could be termed a second surface and, similarly, a second surface could be termed a first surface, without departing from the scope of the various described examples. The first surface and the second surface can both be surfaces and, in some cases, can be separate and different surfaces.

In addition, throughout the specification, the meaning of "a", "an", and "the" includes plural references, and the meaning of "in" includes "in" and "on".

Although some of the various embodiments presented herein constitute a single combination of inventive elements, it should be appreciated that the inventive subject matter is considered to include all possible combinations of the disclosed elements. As such, if one embodiment comprises elements A, B, and C, and another embodiment comprises elements B and D, then the inventive subject matter is also considered to include other remaining combinations of A, B, C, or D, even if not explicitly discussed herein. Further, the transitional term "comprising" means to have as parts or members, or to be those parts or members. As used herein, the transitional term "comprising" is inclusive or open-ended and does not exclude additional, unrecited elements or method steps.

Throughout the following disclosure, numerous references may be made regarding servers, services, interfaces, engines, modules, clients, peers, portals, platforms, or other systems formed from computing devices. It should be appreciated that the use of such terms is deemed to represent one or more computing devices having at least one processor (e.g., ASIC, FPGA, PLD, DSP, x86, ARM, RISC-V, ColdFire, GPU, multi-core processors, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable medium storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, a circuit-switched network, the Internet, LAN, WAN, VPN, or other type of network.

As used in the description herein and throughout the claims that follow, when a system, engine, server, device, module, or other computing element is described as being configured to perform or execute functions on data in a memory, the meaning of "configured to" or "programmed to" is defined as one or more processors or cores of the computing element being programmed by a set of software instructions stored in the memory of the computing element to execute the set of functions on target data or data objects stored in the memory.

It should be noted that any language directed to a computer should be read to include any suitable combination of computing devices or network platforms, including servers, interfaces, systems, databases, agents, peers, engines, controllers, modules, or other types of computing devices operating individually or collectively. One should appreciate the computing devices comprise a processor configured to execute software instructions stored on a tangible, non-transitory computer readable storage medium (e.g., hard drive, FPGA, PLA, solid state drive, RAM, flash, ROM, etc.). The software instructions configure or program the computing device to provide the roles, responsibilities, or other functionality as discussed below with respect to the disclosed apparatus. Further, the disclosed technologies can be embodied as a computer program product that includes a non-transitory computer readable medium storing the software instructions that causes a processor to execute the disclosed steps associated with implementations of computer-based algorithms, processes, methods, or other instructions. In some embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges among devices can be conducted over a packet-switched network, the Internet, LAN, WAN, VPN, or other type of packet switched network; a circuit switched network; cell switched network; or other type of network.

A LiDAR system often includes a polygon mirror for steering light pulses to a field-of-view (FOV). The polygon mirror is usually made from glass with multiple reflective facets to reflect light pulses. The polygon mirror is mounted to a rotational shaft of a motor rotor body. A LiDAR system may be mounted to a vehicle and therefore may need to operate in a wide temperature range (e.g., −40° C. to 85° C.). The shaft of the motor rotor body rotates at a very high speed (e.g., a few thousand rounds-per-minute or rpm), thereby causing the polygon mirror to rotate at high speed as well. The shaft and the rest of the motor rotor body are typically made from metal or alloy. Because the materials used for the polygon mirror and the motor rotor body are different, there is a mismatch of their coefficients of thermal expansion (CTE). A CTE affects the size or volume of an object when there is a temperature change. Typically, the CTE of metal is much higher than that of glass. The CTE mismatch thus causes pressure and/or stress to occur between the glass-based polygon mirror and the metal-based motor rotor body. The pressure and/or stress may also be uneven at different parts of the polygon mirror. Furthermore, a LiDAR system may also be subject to shock and vibration conditions when a vehicle in which the LiDAR system is disposed operates. One or more of the temperature variations, shock conditions, and vibration conditions may cause the polygon mirror to malfunction, underperform (e.g., the polygon mirror may wobble), or even become damaged (e.g., fractured). This may in turn affect the overall performance of the LiDAR system. Thus, there is a need to eliminate or reduce the impact caused by these conditions.

Embodiments of present disclosure are described below. In various embodiments of the present disclosure, an elastomer piece is used to reduce the stress caused by the CTE mismatch between the polygon mirror and the metal-based motor rotor body. This in turn reduces the wobbling of the polygon mirror when it is rotating, thereby improving the performance and stability of the polygon mirror. The material and dimensions of the elastomer piece are also configured and/or selected to optimize the reduction of the stress and to reduce the likelihood of glass fracturing caused by the CTE mismatch. As a result, various embodiments of the present disclosure improve the stability and reliability of the polygon mirror, enhance the capability of the polygon mirror to operate under large variations of the environmental conditions, and improve the overall performance of the LiDAR system.

FIG. 1 illustrates one or more exemplary LiDAR systems 110 disposed or included in a motor vehicle 100. Motor vehicle 100 can be a vehicle having any automated level. For example, motor vehicle 100 can be a partially automated vehicle, a highly automated vehicle, a fully automated vehicle, or a driverless vehicle. A partially automated vehicle can perform some driving functions without a human driver's intervention. For example, a partially automated vehicle can perform blind-spot monitoring, lane keeping and/or lane changing operations, automated emergency braking, smart cruising and/or traffic following, or the like. Certain operations of a partially automated vehicle may be limited to specific applications or driving scenarios (e.g., limited to only freeway driving). A highly automated vehicle can generally perform all operations of a partially automated vehicle but with less limitations. A highly automated vehicle can also detect its own limits in operating the vehicle and ask the driver to take over the control of the vehicle when necessary. A fully automated vehicle can perform all vehicle operations without a driver's intervention but can also detect its own limits and ask the driver to take over when necessary. A driverless vehicle can operate on its own without any driver intervention.

In typical configurations, motor vehicle 100 comprises one or more LiDAR systems 110 and 120A-F. Each of LiDAR systems 110 and 120A-F can be a scanning-based LiDAR system and/or a non-scanning LiDAR system (e.g., a flash LiDAR). A scanning-based LiDAR system scans one or more light beams in one or more directions (e.g., horizontal and vertical directions) to detect objects in a field-of-view (FOV). A non-scanning based LiDAR system transmits laser light to illuminate an FOV without scanning. For example, a flash LiDAR is a type of non-scanning based LiDAR system. A flash LiDAR can transmit laser light to simultaneously illuminate an FOV using a single light pulse or light shot.

A LiDAR system is often an essential sensor of a vehicle that is at least partially automated. In one embodiment, as shown in FIG. 1, motor vehicle 100 may include a single LiDAR system 110 (e.g., without LiDAR systems 120A-F) disposed at the highest position of the vehicle (e.g., at the vehicle roof). Disposing LiDAR system 110 at the vehicle roof facilitates a 360-degree scanning around vehicle 100. In some other embodiments, motor vehicle 100 can include multiple LiDAR systems, including two or more of systems 110 and/or 120A-F. As shown in FIG. 1, in one embodiment, multiple LiDAR systems 110 and/or 120A-F are attached to vehicle 100 at different locations of the vehicle. For example, LiDAR system 120A is attached to vehicle 100 at the front right corner; LiDAR system 120B is attached to vehicle 100 at the front center; LiDAR system 120C is attached to vehicle 100 at the front left corner; LiDAR system 120D is attached to vehicle 100 at the right-side rear view mirror; LiDAR system 120E is attached to vehicle 100 at the left-side rear view mirror; and/or LiDAR system 120F is attached to vehicle 100 at the back center. In some embodiments, LiDAR systems 110 and 120A-F are independent LiDAR systems having their own respective laser sources, control electronics, transmitters, receivers, and/or steering mechanisms. In other embodiments, some of LiDAR systems 110 and 120A-F can share one or more components, thereby forming a distributed sensor system. In one example, optical fibers are used to deliver laser light from a centralized laser source to all LiDAR systems. It is understood that one or more LiDAR systems can be distributed and attached to a vehicle in any desired manner and FIG. 1 only illustrates one embodiment. As another example, LiDAR systems 120D and 120E may be attached to the B-pillars of vehicle 100 instead of the rear-view mirrors. As another example, LiDAR system 120B may be attached to the windshield of vehicle 100 instead of the front bumper.

Figure 2:
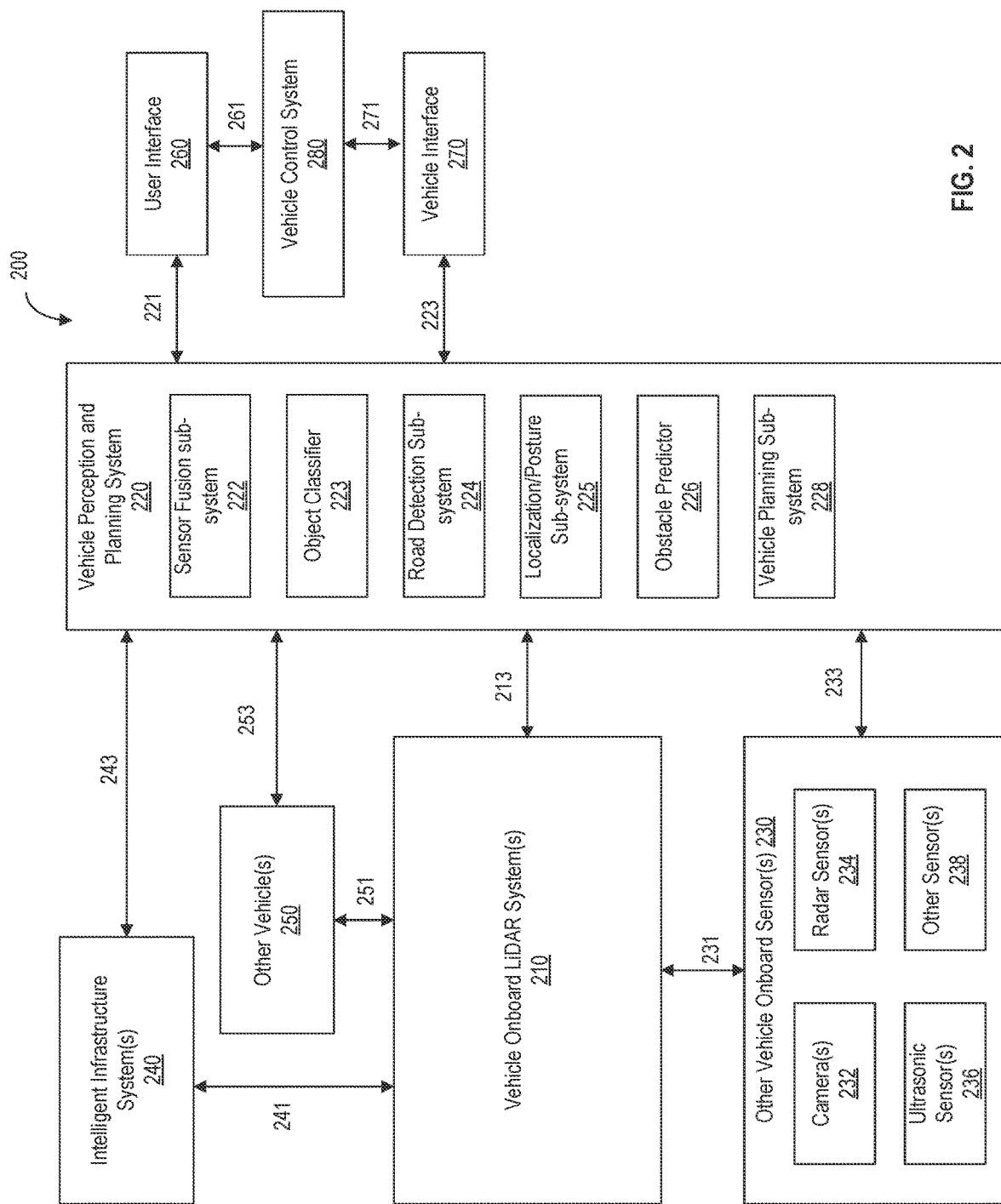
FIG. 2 is a block diagram illustrating interactions between an exemplary LiDAR system and multiple other systems including a vehicle perception and planning system.

FIG. 2 is a block diagram 200 illustrating interactions between vehicle onboard LiDAR system(s) 210 and multiple other systems including a vehicle perception and planning system 220. LiDAR system(s) 210 can be mounted on or integrated to a vehicle. LiDAR system(s) 210 include sensor(s) that scan laser light to the surrounding environment to measure the distance, angle, and/or velocity of objects. Based on the scattered light that returned to LiDAR system(s) 210, it can generate sensor data (e.g., image data or 3D point cloud data) representing the perceived external environment.

LiDAR system(s) 210 can include one or more of short-range LiDAR sensors, medium-range LiDAR sensors, and long-range LiDAR sensors. A short-range LiDAR sensor measures objects located up to about 20-40 meters from the LiDAR sensor. Short-range LiDAR sensors can be used for, e.g., monitoring nearby moving objects (e.g., pedestrians crossing street in a school zone), parking assistance applications, or the like. A medium-range LiDAR sensor measures objects located up to about 100-150 meters from the LiDAR sensor. Medium-range LiDAR sensors can be used for, e.g., monitoring road intersections, assistance for merging onto or leaving a freeway, or the like. A long-range LiDAR sensor measures objects located up to about 150-300 meters. Long-range LiDAR sensors are typically used when a vehicle is travelling at high speed (e.g., on a freeway), such that the vehicle's control systems may only have a few seconds (e.g., 6-8 seconds) to respond to any situations detected by the LiDAR sensor. As shown in FIG. 2, in one embodiment, the LiDAR sensor data can be provided to vehicle perception and planning system 220 via a communication path 213 for further processing and controlling the vehicle operations. Communication path 213 can be any wired or wireless communication links that can transfer data.

With reference still to FIG. 2, in some embodiments, other vehicle onboard sensor(s) 230 are used to provide additional sensor data separately or together with LiDAR system(s) 210. Other vehicle onboard sensors 230 may include, for example, one or more camera(s) 232, one or more radar(s) 234, one or more ultrasonic sensor(s) 236, and/or other sensor(s) 238. Camera(s) 232 can take images and/or videos of the external environment of a vehicle. Camera(s) 232 can take, for example, high-definition (HD) videos having millions of pixels in each frame. A camera produces monochrome or color images and videos. Color information may be important in interpreting data for some situations (e.g., interpreting images of traffic lights). Color information may not be available from other sensors such as LiDAR or radar sensors. Camera(s) 232 can include one or more of narrow-focus cameras, wider-focus cameras, side-facing cameras, infrared cameras, fisheye cameras, or the like. The image and/or video data generated by camera(s) 232 can also be provided to vehicle perception and planning system 220 via communication path 233 for further processing and controlling the vehicle operations. Communication path 233 can be any wired or wireless communication links that can transfer data.

Other vehicle onboard sensors(s) 230 can also include radar sensor(s) 234. Radar sensor(s) 234 use radio waves to determine the range, angle, and velocity of objects. Radar sensor(s) 234 produce electromagnetic waves in the radio or microwave spectrum. The electromagnetic waves reflect off an object and some of the reflected waves return to the radar sensor, thereby providing information about the object's position and velocity. Radar sensor(s) 234 can include one or more of short-range radar(s), medium-range radar(s), and long-range radar(s). A short-range radar measures objects located at about 0.1-30 meters from the radar. A short-range radar is useful in detecting objects located nearby the vehicle, such as other vehicles, buildings, walls, pedestrians, bicyclists, etc. A short-range radar can be used to detect a blind spot, assist in lane changing, provide rear-end collision warning, assist in parking, provide emergency braking, or the like. A medium-range radar measures objects located at about 30-80 meters from the radar. A long-range radar measures objects located at about 80-200 meters. Medium- and/or long-range radars can be useful in, for example, traffic following, adaptive cruise control, and/or highway automatic braking. Sensor data generated by radar sensor(s) 234 can also be provided to vehicle perception and planning system 220 via communication path 233 for further processing and controlling the vehicle operations.

Other vehicle onboard sensor(s) 230 can also include ultrasonic sensor(s) 236. Ultrasonic sensor(s) 236 use acoustic waves or pulses to measure object located external to a vehicle. The acoustic waves generated by ultrasonic sensor(s) 236 are transmitted to the surrounding environment. At least some of the transmitted waves are reflected off an object and return to the ultrasonic sensor(s) 236. Based on the return signals, a distance of the object can be calculated. Ultrasonic sensor(s) 236 can be useful in, for example, check blind spot, identify parking spots, provide lane changing assistance into traffic, or the like. Sensor data generated by ultrasonic sensor(s) 236 can also be provided to vehicle perception and planning system 220 via communication path 233 for further processing and controlling the vehicle operations.

In some embodiments, one or more other sensor(s) 238 may be attached in a vehicle and may also generate sensor data. Other sensor(s) 238 may include, for example, global positioning systems (GPS), inertial measurement units (IMU), or the like. Sensor data generated by other sensor(s) 238 can also be provided to vehicle perception and planning system 220 via communication path 233 for further processing and controlling the vehicle operations. It is understood that communication path 233 may include one or more communication links to transfer data between the various sensor(s) 230 and vehicle perception and planning system 220.

In some embodiments, as shown in FIG. 2, sensor data from other vehicle onboard sensor(s) 230 can be provided to vehicle onboard LiDAR system(s) 210 via communication path 231. LiDAR system(s) 210 may process the sensor data from other vehicle onboard sensor(s) 230. For example, sensor data from camera(s) 232, radar sensor(s) 234, ultrasonic sensor(s) 236, and/or other sensor(s) 238 may be correlated or fused with sensor data LiDAR system(s) 210, thereby at least partially offloading the sensor fusion process performed by vehicle perception and planning system 220. It is understood that other configurations may also be implemented for transmitting and processing sensor data from the various sensors (e.g., data can be transmitted to a cloud service for processing and then the processing results can be transmitted back to the vehicle perception and planning system 220).

With reference still to FIG. 2, in some embodiments, sensors onboard other vehicle(s) 250 are used to provide additional sensor data separately or together with LiDAR system(s) 210. For example, two or more nearby vehicles may have their own respective LiDAR sensor(s), camera(s), radar sensor(s), ultrasonic sensor(s), etc. Nearby vehicles can communicate and share sensor data with one another. Communications between vehicles are also referred to as V2V (vehicle to vehicle) communications. For example, as shown in FIG. 2, sensor data generated by other vehicle(s) 250 can be communicated to vehicle perception and planning system 220 and/or vehicle onboard LiDAR system(s) 210, via communication path 253 and/or communication path 251, respectively. Communication paths 253 and 251 can be any wired or wireless communication links that can transfer data.

Sharing sensor data facilitates a better perception of the environment external to the vehicles. For instance, a first vehicle may not sense a pedestrian that is a behind a second vehicle but is approaching the first vehicle. The second vehicle may share the sensor data related to this pedestrian with the first vehicle such that the first vehicle can have additional reaction time to avoid collision with the pedestrian. In some embodiments, similar to data generated by sensor(s) 230, data generated by sensors onboard other vehicle(s) 250 may be correlated or fused with sensor data generated by LiDAR system(s) 210, thereby at least partially offloading the sensor fusion process performed by vehicle perception and planning system 220.

In some embodiments, intelligent infrastructure system(s) 240 are used to provide sensor data separately or together with LiDAR system(s) 210. Certain infrastructures may be configured to communicate with a vehicle to convey information and vice versa. Communications between a vehicle and infrastructures are generally referred to as V2I (vehicle to infrastructure) communications. For example, intelligent infrastructure system(s) 240 may include an intelligent traffic light that can convey its status to an approaching vehicle in a message such as "changing to yellow in 5 seconds." Intelligent infrastructure system(s) 240 may also include its own LiDAR system mounted near an intersection such that it can convey traffic monitoring information to a vehicle. For example, a left-turning vehicle at an intersection may not have sufficient sensing capabilities because some of its own sensors may be blocked by traffics in the opposite direction. In such a situation, sensors of intelligent infrastructure system(s) 240 can provide useful, and sometimes vital, data to the left-turning vehicle. Such data may include, for example, traffic conditions, information of objects in the direction the vehicle is turning to, traffic light status and predictions, or the like. These sensor data generated by intelligent infrastructure system(s) 240 can be provided to vehicle perception and planning system 220 and/or vehicle onboard LiDAR system(s) 210, via communication paths 243 and/or 241, respectively. Communication paths 243 and/or 241 can include any wired or wireless communication links that can transfer data. For example, sensor data from intelligent infrastructure system(s) 240 may be transmitted to LiDAR system(s) 210 and correlated or fused with sensor data generated by LiDAR system(s) 210, thereby at least partially offloading the sensor fusion process performed by vehicle perception and planning system 220. V2V and V2I communications described above are examples of vehicle-to-X (V2X) communications, where the "X" represents any other devices, systems, sensors, infrastructure, or the like that can share data with a vehicle.

With reference still to FIG. 2, via various communication paths, vehicle perception and planning system 220 receives sensor data from one or more of LiDAR system(s) 210, other vehicle onboard sensor(s) 230, other vehicle(s) 250, and/or intelligent infrastructure system(s) 240. In some embodiments, different types of sensor data are correlated and/or integrated by a sensor fusion sub-system 222. For example, sensor fusion sub-system 222 can generate a 360-degree model using multiple images or videos captured by multiple cameras disposed at different positions of the vehicle. Sensor fusion sub-system 222 obtains sensor data from different types of sensors and uses the combined data to perceive the environment more accurately. For example, a vehicle onboard camera 232 may not capture a clear image because it is facing the sun or a light source (e.g., another vehicle's headlight during nighttime) directly. A LiDAR system 210 may not be affected as much and therefore sensor fusion sub-system 222 can combine sensor data provided by both camera 232 and LiDAR system 210, and use the sensor data provided by LiDAR system 210 to compensate the unclear image captured by camera 232. As another example, in a rainy or foggy weather, a radar sensor 234 may work better than a camera 232 or a LiDAR system 210. Accordingly, sensor fusion sub-system 222 may use sensor data provided by the radar sensor 234 to compensate the sensor data provided by camera 232 or LiDAR system 210.

In other examples, sensor data generated by other vehicle onboard sensor(s) 230 may have a lower resolution (e.g., radar sensor data) and thus may need to be correlated and confirmed by LiDAR system(s) 210, which usually has a higher resolution. For example, a sewage cover (also referred to as a manhole cover) may be detected by radar sensor 234 as an object towards which a vehicle is approaching. Due to the low-resolution nature of radar sensor 234, vehicle perception and planning system 220 may not be able to determine whether the object is an obstacle that the vehicle needs to avoid. High-resolution sensor data generated by LiDAR system(s) 210 thus can be used to correlated and confirm that the object is a sewage cover and causes no harm to the vehicle.

Vehicle perception and planning system 220 further comprises an object classifier 223. Using raw sensor data and/or correlated/fused data provided by sensor fusion sub-system 222, object classifier 223 can detect and classify the objects and estimate the positions of the objects. In some embodiments, object classifier 233 can use machine-learning based techniques to detect and classify objects. Examples of the machine-learning based techniques include utilizing algorithms such as region-based convolutional neural networks (R-CNN), Fast R-CNN, Faster R-CNN, histogram of oriented gradients (HOG), region-based fully convolutional network (R-FCN), single shot detector (SSD), spatial pyramid pooling (SPP-net), and/or You Only Look Once (Yolo).

Vehicle perception and planning system 220 further comprises a road detection sub-system 224. Road detection sub-system 224 localizes the road and identifies objects and/or markings on the road. For example, based on raw or fused sensor data provided by radar sensor(s) 234, camera(s) 232, and/or LiDAR system(s) 210, road detection sub-system 224 can build a 3D model of the road based on machine-learning techniques (e.g., pattern recognition algorithms for identifying lanes). Using the 3D model of the road, road detection sub-system 224 can identify objects (e.g., obstacles or debris on the road) and/or markings on the road (e.g., lane lines, turning marks, crosswalk marks, or the like).

Vehicle perception and planning system 220 further comprises a localization and vehicle posture sub-system 225. Based on raw or fused sensor data, localization and vehicle posture sub-system 225 can determine position of the vehicle and the vehicle's posture. For example, using sensor data from LiDAR system(s) 210, camera(s) 232, and/or GPS data, localization and vehicle posture sub-system 225 can determine an accurate position of the vehicle on the road and the vehicle's six degrees of freedom (e.g., whether the vehicle is moving forward or backward, up or down, and left or right). In some embodiments, high-definition (HD) maps are used for vehicle localization. HD maps can provide highly detailed, three-dimensional, computerized maps that pinpoint a vehicle's location. For instance, using the HD maps, localization and vehicle posture sub-system 225 can determine precisely the vehicle's current position (e.g., which lane of the road the vehicle is currently in, how close it is to a curb or a sidewalk) and predict vehicle's future positions.

Vehicle perception and planning system 220 further comprises obstacle predictor 226. Objects identified by object classifier 223 can be stationary (e.g., a light pole, a road sign) or dynamic (e.g., a moving pedestrian, bicycle, another car). For moving objects, predicting their moving path or future positions can be important to avoid collision. Obstacle predictor 226 can predict an obstacle trajectory and/or warn the driver or the vehicle planning sub-system 228 about a potential collision. For example, if there is a high likelihood that the obstacle's trajectory intersects with the vehicle's current moving path, obstacle predictor 226 can generate such a warning. Obstacle predictor 226 can use a variety of techniques for making such a prediction. Such techniques include, for example, constant velocity or acceleration models, constant turn rate and velocity/acceleration models, Kalman Filter and Extended Kalman Filter based models, recurrent neural network (RNN) based models, long short-term memory (LSTM) neural network based models, encoder-decoder RNN models, or the like.

With reference still to FIG. 2, in some embodiments, vehicle perception and planning system 220 further comprises vehicle planning sub-system 228. Vehicle planning sub-system 228 can include a route planner, a driving behaviors planner, and a motion planner. The route planner can plan the route of a vehicle based on the vehicle's current location data, target location data, traffic information, etc. The driving behavior planner adjusts the timing and planned movement based on how other objects might move, using the obstacle prediction results provided by obstacle predictor 226. The motion planner determines the specific operations the vehicle needs to follow. The planning results are then communicated to vehicle control system 280 via vehicle interface 270. The communication can be performed through communication paths 223 and 271, which include any wired or wireless communication links that can transfer data.

Vehicle control system 280 controls the vehicle's steering mechanism, throttle, brake, etc., to operate the vehicle according to the planned route and movement. Vehicle perception and planning system 220 may further comprise a user interface 260, which provides a user (e.g., a driver) access to vehicle control system 280 to, for example, override or take over control of the vehicle when necessary. User interface 260 can communicate with vehicle perception and planning system 220, for example, to obtain and display raw or fused sensor data, identified objects, vehicle's location/posture, etc. These displayed data can help a user to better operate the vehicle. User interface 260 can communicate with vehicle perception and planning system 220 and/or vehicle control system 280 via communication paths 221 and 261 respectively, which include any wired or wireless communication links that can transfer data. It is understood that the various systems, sensors, communication links, and interfaces in FIG. 2 can be configured in any desired manner and not limited to the configuration shown in FIG. 2.

Figure 3:
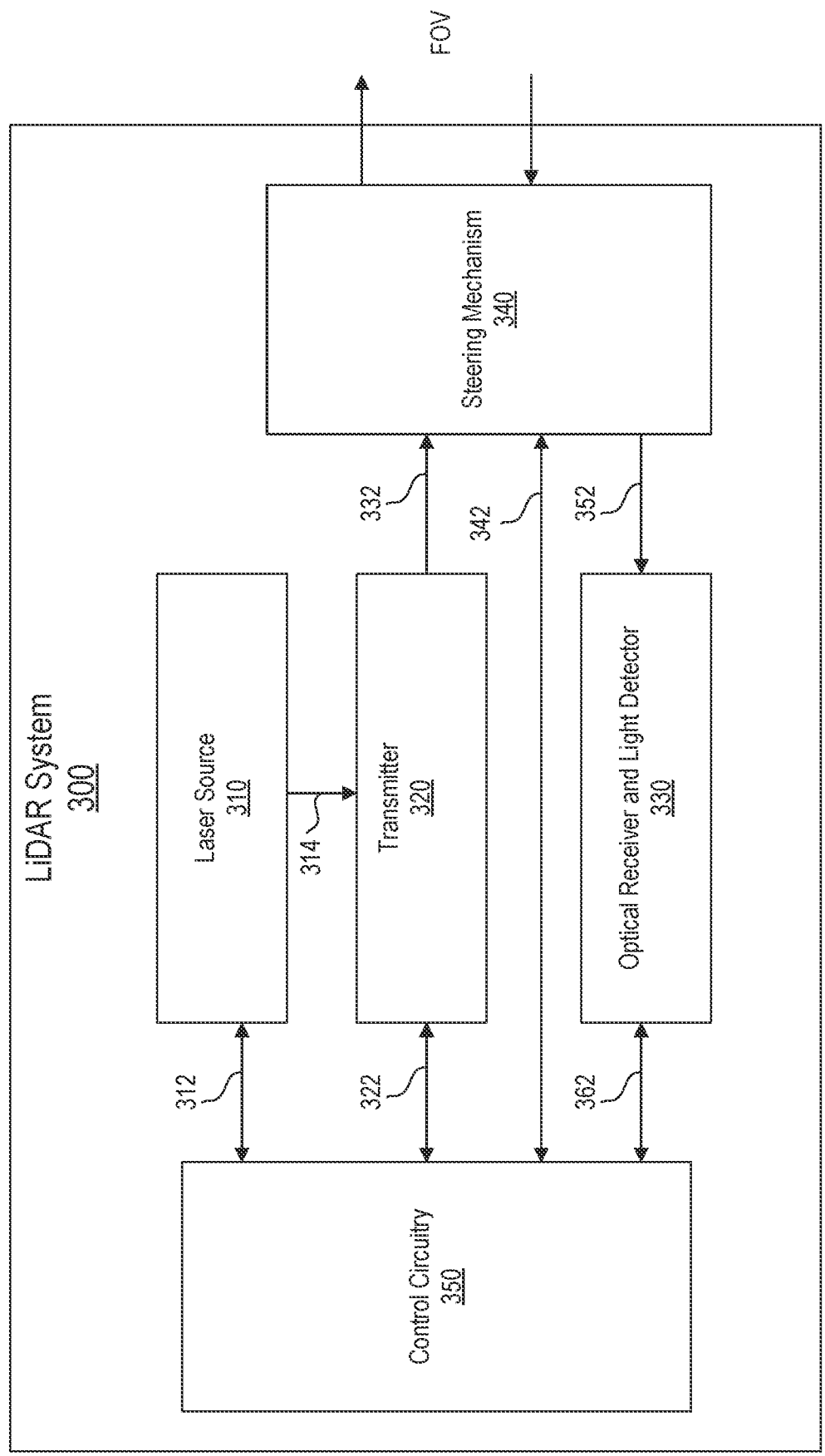
FIG. 3 is a block diagram illustrating an exemplary LiDAR system.

FIG. 3 is a block diagram illustrating an exemplary LiDAR system 300. LiDAR system 300 can be used to implement LiDAR system 110, 120A-F, and/or 210 shown in FIGS. 1 and 2. In one embodiment, LiDAR system 300 comprises a laser source 310, a transmitter 320, an optical receiver and light detector 330, a steering system 340, and a control circuitry 350. These components are coupled together using communications paths 312, 314, 322, 332, 343, 352, and 362. These communications paths include communication links (wired or wireless, bidirectional or unidirectional) among the various LiDAR system components, but need not be physical components themselves. While the communications paths can be implemented by one or more electrical wires, buses, or optical fibers, the communication paths can also be wireless channels or free-space optical paths so that no physical communication medium is present. For example, in one embodiment of LiDAR system 300, communication path 314 between laser source 310 and transmitter 320 may be implemented using one or more optical fibers. Communication paths 332 and 352 may represent optical paths implemented using free space optical components and/or optical fibers. And communication paths 312, 322, 342, and 362 may be implemented using one or more electrical wires that carry electrical signals. The communications paths can also include one or more of the above types of communication mediums (e.g., they can include an optical fiber and a free-space optical component, or include one or more optical fibers and one or more electrical wires).

LiDAR system 300 can also include other components not depicted in FIG. 3, such as power buses, power supplies, LED indicators, switches, etc. Additionally, other communication connections among components may be present, such as a direct connection between light source 310 and optical receiver and light detector 330 to provide a reference signal so that the time from when a light pulse is transmitted until a return light pulse is detected can be accurately measured.

Laser source 310 outputs laser light for illuminating objects in a field of view (FOV). Laser source 310 can be, for example, a semiconductor-based laser (e.g., a diode laser) and/or a fiber-based laser. A semiconductor-based laser can be, for example, an edge emitting laser (EEL), a vertical cavity surface emitting laser (VCSEL), or the like.

A fiber-based laser is a laser in which the active gain medium is an optical fiber doped with rare-earth elements such as erbium, ytterbium, neodymium, dysprosium, praseodymium, thulium and/or holmium. In some embodiments, a fiber laser is based on double-clad fibers, in which the gain medium forms the core of the fiber surrounded by two layers of cladding. The double-clad fiber allows the core to be pumped with a high-power beam, thereby enabling the laser source to be a high power fiber laser source.

In some embodiments, laser source 310 comprises a master oscillator (also referred to as a seed laser) and power amplifier (MOPA). The power amplifier amplifies the output power of the seed laser. The power amplifier can be a fiber amplifier, a bulk amplifier, or a semiconductor optical amplifier. The seed laser can be a solid-state bulk laser or a tunable external-cavity diode laser. In some embodiments, laser source 310 can be an optically pumped microchip laser. Microchip lasers are alignment-free monolithic solid-state lasers where the laser crystal is directly contacted with the end mirrors of the laser resonator. A microchip laser is typically pumped with a laser diode (directly or using a fiber) to obtain the desired output power. A microchip laser can be based on neodymium-doped yttrium aluminum garnet ($Y_3Al_5O_{12}$) laser crystals (i.e., Nd:YAG), or neodymium-doped vanadate (i.e., $ND:YVO_4$) laser crystals.

Figure 4:
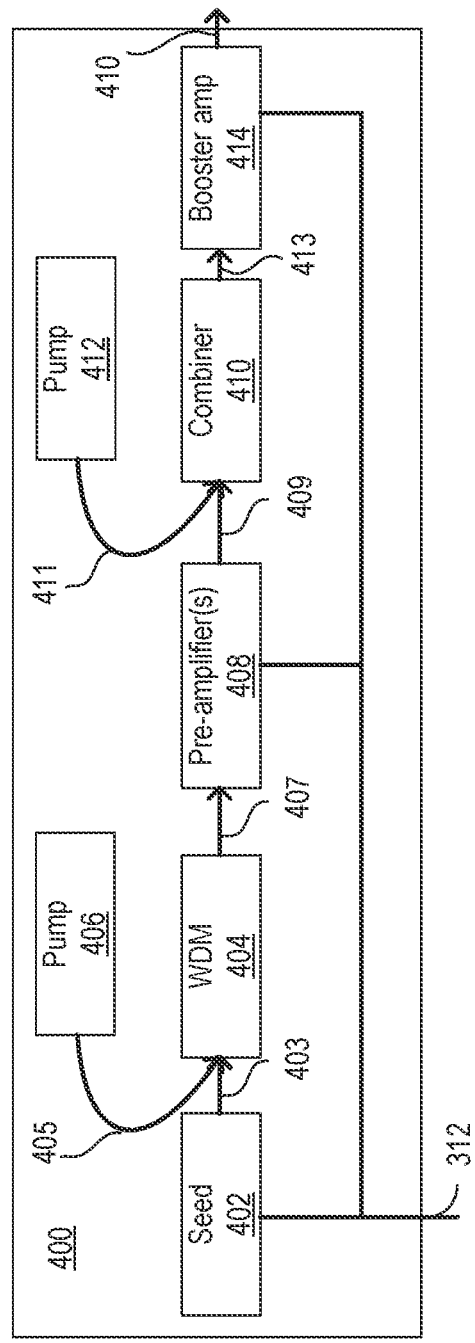
FIG. 4 is a block diagram illustrating an exemplary fiber-based laser source.

FIG. 4 is a block diagram illustrating an exemplary fiber-based laser source 400 having a seed laser and one or more pumps (e.g., laser diodes) for pumping desired output power. Fiber-based laser source 400 is an example of laser source 310 depicted in FIG. 3. In some embodiments, fiber-based laser source 400 comprises a seed laser 402 to generate initial light pulses of one or more wavelengths (e.g., 1550 nm), which are provided to a wavelength-division multiplexor (WDM) 404 via an optical fiber 403. Fiber-based laser source 400 further comprises a pump 406 for providing laser power (e.g., of a different wavelength, such as 980 nm) to WDM 404 via an optical fiber 405. WDM 404 multiplexes the light pulses provided by seed laser 402 and the laser power provided by pump 406 onto a single optical fiber 407. The output of WDM 404 can then be provided to one or more pre-amplifier(s) 408 via optical fiber 407. Pre-amplifier(s) 408 can be optical amplifier(s) that amplify optical signals (e.g., with about 20-30 dB gain). In some embodiments, pre-amplifier(s) 408 are low noise amplifiers. Pre-amplifier(s) 408 output to a combiner 410 via an optical fiber 409. Combiner 410 combines the output laser light of pre-amplifier(s) 408 with the laser power provided by pump 412 via an optical fiber 411. Combiner 410 can combine optical signals having the same wavelength or different wavelengths. One example of a combiner is a WDM. Combiner 410 provides pulses to a booster amplifier 414, which produces output light pulses via optical fiber 410. The booster amplifier 414 provides further amplification of the optical signals. The outputted light pulses can then be transmitted to transmitter 320 and/or steering mechanism 340 (shown in FIG. 3). It is understood that FIG. 4 illustrates one exemplary configuration of fiber-based laser source 400. Laser source 400 can have many other configurations using different combinations of one or more components shown in FIG. 4 and/or other components not shown in FIG. 4 (e.g., other components such as power supplies, lens, filters, splitters, combiners, etc.).

In some variations, fiber-based laser source 400 can be controlled (e.g., by control circuitry 350) to produce pulses of different amplitudes based on the fiber gain profile of the fiber used in fiber-based laser source 400. Communication path 312 couples fiber-based laser source 400 to control circuitry 350 (shown in FIG. 3) so that components of fiber-based laser source 400 can be controlled by or otherwise communicate with control circuitry 350. Alternatively, fiber-based laser source 400 may include its own dedicated controller. Instead of control circuitry 350 communicating directly with components of fiber-based laser source 400, a dedicated controller of fiber-based laser source 400 communicates with control circuitry 350 and controls and/or communicates with the components of fiber-based light source 400. Fiber-based light source 400 can also include other components not shown, such as one or more power connectors, power supplies, and/or power lines.

Referencing FIG. 3, typical operating wavelengths of laser source 310 comprise, for example, about 850 nm, about 905 nm, about 940 nm, about 1064 nm, and about 1550 nm. The upper limit of maximum usable laser power is set by the U.S. FDA (U.S. Food and Drug Administration) regulations. The optical power limit at 1550 nm wavelength is much higher than those of the other aforementioned wavelengths. Further, at 1550 nm, the optical power loss in a fiber is low. There characteristics of the 1550 nm wavelength make it more beneficial for long-range LiDAR applications. The amount of optical power output from laser source 310 can be characterized by its peak power, average power, and the pulse energy. The peak power is the ratio of pulse energy to the width of the pulse (e.g., full width at half maximum or FWHM). Thus, a smaller pulse width can provide a larger peak power for a fixed amount of pulse energy. A pulse width can be in the range of nanosecond or picosecond. The average power is the product of the energy of the pulse and the pulse repetition rate (PRR). As described in more detail below, the PRR represents the frequency of the pulsed laser light. The PRR typically corresponds to the maximum range that a LiDAR system can measure. Laser source 310 can be configured to produce pulses at high PRR to meet the desired number of data points in a point cloud generated by the LiDAR system. Laser source 310 can also be configured to produce pulses at medium or low PRR to meet the desired maximum detection distance. Wall plug efficiency (WPE) is another factor to evaluate the total power consumption, which may be a key indicator in evaluating the laser efficiency. For example, as shown in FIG. 1, multiple LiDAR systems may be attached to a vehicle, which may be an electrical-powered vehicle or a vehicle otherwise having limited fuel or battery power supply. Therefore, high WPE and intelligent ways to use laser power are often among the important considerations when selecting and configuring laser source 310 and/or designing laser delivery systems for vehicle-mounted LiDAR applications.

It is understood that the above descriptions provide non-limiting examples of a laser source 310. Laser source 310 can be configured to include many other types of light sources (e.g., laser diodes, short-cavity fiber lasers, solid-state lasers, and/or tunable external cavity diode lasers) that are configured to generate one or more light signals at various wavelengths. In some examples, light source 310 comprises amplifiers (e.g., pre-amplifiers and/or booster amplifiers), which can be a doped optical fiber amplifier, a solid-state bulk amplifier, and/or a semiconductor optical amplifier. The amplifiers are configured to receive and amplify light signals with desired gains.

With reference back to FIG. 3, LiDAR system 300 further comprises a transmitter 320. Laser source 310 provides laser light (e.g., in the form of a laser beam) to transmitter 320. The laser light provided by laser source 310 can be amplified laser light with a predetermined or controlled wavelength, pulse repetition rate, and/or power level. Transmitter 320 receives the laser light from laser source 310 and transmits the laser light to steering mechanism 340 with low divergence. In some embodiments, transmitter 320 can include, for example, optical components (e.g., lens, fibers, mirrors, etc.) for transmitting laser beams to a field-of-view (FOV) directly or via steering mechanism 340. While FIG. 3 illustrates transmitter 320 and steering mechanism 340 as separate components, they may be combined or integrated as one system in some embodiments. Steering mechanism 340 is described in more detail below.

Laser beams provided by laser source 310 may diverge as they travel to transmitter 320. Therefore, transmitter 320 often comprises a collimating lens configured to collect the diverging laser beams and produce parallel optical beams with reduced or minimum divergence. The parallel optical beams can then be further directed through various optics such as mirrors and lens. A collimating lens may be, for example, a plano-convex lens. The collimating lens can be configured to have any desired properties such as the beam diameter, divergence, numerical aperture, focal length, or the like. A beam propagation ratio or beam quality factor (also referred to as the $M^2$ factor) is used for measurement of laser beam quality. In many LiDAR applications, it is important to control good laser beam quality in generated a transmitting laser beam. The $M^2$ factor represents a degree of variation of a beam from an ideal Gaussian beam. Thus, the $M^2$ factor reflects how well a collimated laser beam can be focused on a small spot, or how well a divergent laser beam can be collimated. The smaller the $M^2$ factor, the tighter the focus of the laser beam and the more intense a beam spot can be obtained. Therefore, laser source 310 and/or transmitter 320 can be configured to obtained desired $M^2$ factor according to, for example, a scan resolution requirement.

One or more of the light beams provided by transmitter 320 are scanned by steering mechanism 340 to a FOV. Steering mechanism 340 scans light beams in multiple dimensions (e.g., in both the horizontal and vertical dimension) to facilitate LiDAR system 300 to map the environment by generating a 3D point cloud. Steering mechanism 340 will be described in more detail below. The laser light scanned to an FOV may be scattered or reflected by an object in the FOV. At least a portion of the scattered or reflected light returns to LiDAR system 300. FIG. 3 further illustrates an optical receiver and light detector 330 configured to receive the return light. Optical receiver and light detector 330 comprises an optical receiver that is configured to collect the return light from the FOV. The optical receiver can include optics (e.g., lens, fibers, mirrors, etc.) for receiving, redirecting, focus, amplifying, and/or filtering return light from the FOV. For example, the optical receiver often includes a receiver lens or focusing lens (e.g., a plano-convex lens) to collect and/or focus the collected return light onto a light detector.

A light detector detects the return light focused by the optical receiver and generates current and/or voltage signals proportional to the incident intensity of the return light. Based on such current and/or voltage signals, the depth information of the object in the FOV can be derived. One exemplary method for deriving such depth information is based on the direct TOF (time of flight), which is described in more detail below. A light detector may be characterized by its detection sensitivity, quantum efficiency, detector bandwidth, linearity, signal to noise ratio (SNR), overload resistance, interference immunity, etc. Based on the applications, the light detector can be configured or customized to have any desired characteristics. For example, optical receiver and light detector 330 can be configured such that the light detector has a large dynamic range while having a good linearity. The light detector linearity indicates the detector's capability of maintaining linear relationship between input optical signal power and the detector's output. A detector having good linearity can maintain a linear relationship over a large dynamic input optical signal range.

To achieve desired detector characteristics, configurations or customizations can be made to the light detector's structure and/or the detector's material system. Various detector structure can be used for a light detector. For example, a light detector structure can be a PIN based structure, which has a undoped intrinsic semiconductor region (i.e., an "i" region) between a p-type semiconductor and an n-type semiconductor region. Other light detector structures comprise, for example, a APD (avalanche photodiode) based structure, a PMT (photomultiplier tube) based structure, a SiPM (Silicon photomultiplier) based structure, a SPAD (single-photon avalanche diode) base structure, and/or quantum wires. For material systems used in a light detector, Si, InGaAs, and/or Si/Ge based materials can be used. It is understood that many other detector structures and/or material systems can be used in optical receiver and light detector 330.

A light detector (e.g., an APD based detector) may have an internal gain such that the input signal is amplified when generating an output signal. However, noise may also be amplified due to the light detector's internal gain. Common types of noise include signal shot noise, dark current shot noise, thermal noise, and amplifier noise (TIA). In some embodiments, optical receiver and light detector 330 may include a pre-amplifier that is a low noise amplifier (LNA). In some embodiments, the pre-amplifier may also include a TIA-transimpedance amplifier, which converts a current signal to a voltage signal. For a linear detector system, input equivalent noise or noise equivalent power (NEP) measures how sensitive the light detector is to weak signals. Therefore, they can be used as indicators of the overall system performance. For example, the NEP of a light detector specifies the power of the weakest signal that can be detected and therefore it in turn specifies the maximum range of a LiDAR system. It is understood that various light detector optimization techniques can be used to meet the requirement of LiDAR system 300. Such optimization techniques may include selecting different detector structures, materials, and/or implement signal processing techniques (e.g., filtering, noise reduction, amplification, or the like). For example, in addition to or instead of using direct detection of return signals (e.g., by using TOF), coherent detection can also be used for a light detector. Coherent detection allows for detecting amplitude and phase information of the received light by interfering the received light with a local oscillator. Coherent detection can improve detection sensitivity and noise immunity.

FIG. 3 further illustrates that LiDAR system 300 comprises steering mechanism 340. As described above, steering mechanism 340 directs light beams from transmitter 320 to scan an FOV in multiple dimensions. A steering mechanism is referred to as a raster mechanism or a scanning mechanism. Scanning light beams in multiple directions (e.g., in both the horizontal and vertical directions) facilitates a LiDAR system to map the environment by generating an image or a 3D point cloud. A steering mechanism can be based on mechanical scanning and/or solid-state scanning. Mechanical scanning uses rotating mirrors to steer the laser beam or physically rotate the LiDAR transmitter and receiver (collectively referred to as transceiver) to scan the laser beam. Solid-state scanning directs the laser beam to various positions through the FOV without mechanically moving any macroscopic components such as the transceiver. Solid-state scanning mechanisms include MEMS mirror based steering, optical phased arrays based steering, and flash LiDAR based steering. In some embodiments, because solid-state scanning mechanisms do not physically move macroscopic components, the steering performed by a solid-state scanning mechanism may be referred to as effective steering. A LiDAR system using solid-state scanning may also be referred to as a non-mechanical scanning or simply non-scanning LiDAR system (a flash LiDAR system is an exemplary non-scanning LiDAR system).

Steering mechanism 340 can be used with the transceiver (e.g., transmitter 320 and optical receiver and light detector 330) to scan the FOV for generating an image or a 3D point cloud. As an example, to implement steering mechanism 340, a two-dimensional mechanical scanner can be used with a single-point or several single-point transceivers. A single-point transceiver transmits a single light beam or a small number of light beams (e.g., 2-8 beams) to the steering mechanism. A two-dimensional mechanical steering mechanism comprises, for example, polygon mirror(s), oscillating mirror(s), rotating prism(s), rotating tilt mirror surface(s), or a combination thereof. In some embodiments, steering mechanism 340 may include non-mechanical steering mechanism(s) such as solid-state steering mechanism(s). For example, steering mechanism 340 can be based on tuning wavelength of the laser light combined with refraction effect, and/or based on reconfigurable grating/phase array. In some embodiments, steering mechanism 340 can use a single scanning device to achieve two-dimensional scanning or two devices combined to realize two-dimensional scanning.

As another example, to implement steering mechanism 340, a one-dimensional mechanical scanner can be used with an array or a large number of single-point transceivers. Specifically, the transceiver array can be mounted on a rotating platform to achieve 360-degree horizontal field of view. Alternatively, a static transceiver array can be combined with the one-dimensional mechanical scanner. A one-dimensional mechanical scanner comprises polygon mirror(s), oscillating mirror(s), rotating prism(s), rotating tilt mirror surface(s) for obtaining a forward-looking horizontal field of view. Steering mechanisms using mechanical scanners can provide robustness and reliability in high volume production for automotive applications.

As another example, to implement steering mechanism 340, a two-dimensional transceiver can be used to generate a scan image or a 3D point cloud directly. In some embodiments, a stitching or micro shift method can be used to improve the resolution of the scan image or the field of view being scanned. For example, using a two-dimensional transceiver, signals generated at one direction (e.g., the horizontal direction) and signals generated at the other direction (e.g., the vertical direction) may be integrated, interleaved, and/or matched to generate a higher or full resolution image or 3D point cloud representing the scanned FOV.

Some implementations of steering mechanism 340 comprise one or more optical redirection elements (e.g., mirrors or lens) that steer return light signals (e.g., by rotating, vibrating, or directing) along a receive path to direct the return light signals to optical receiver and light detector 330. The optical redirection elements that direct light signals along the transmitting and receiving paths may be the same components (e.g., shared), separate components (e.g., dedicated), and/or a combination of shared and separate components. This means that in some cases the transmitting and receiving paths are different although they may partially overlap (or in some cases, substantially overlap).

With reference still to FIG. 3, LiDAR system 300 further comprises control circuitry 350. Control circuitry 350 can be configured and/or programmed to control various parts of the LiDAR system 300 and/or to perform signal processing. In a typical system, control circuitry 350 can be configured and/or programmed to perform one or more control operations including, for example, controlling laser source 310 to obtain desired laser pulse timing, repetition rate, and power; controlling steering mechanism 340 (e.g., controlling the speed, direction, and/or other parameters) to scan the FOV and maintain pixel registration/alignment; controlling optical receiver and light detector 330 (e.g., controlling the sensitivity, noise reduction, filtering, and/or other parameters) such that it is an optimal state; and monitoring overall system health/status for functional safety.

Control circuitry 350 can also be configured and/or programmed to perform signal processing to the raw data generated by optical receiver and light detector 330 to derive distance and reflectance information, and perform data packaging and communication to vehicle perception and planning system 220 (shown in FIG. 2). For example, control circuitry 350 determines the time it takes from transmitting a light pulse until a corresponding return light pulse is received; determines when a return light pulse is not received for a transmitted light pulse; determines the direction (e.g., horizontal and/or vertical information) for a transmitted/return light pulse; determines the estimated range in a particular direction; and/or determines any other type of data relevant to LiDAR system 300.

LiDAR system 300 can be disposed in a vehicle, which may operate in many different environments including hot or cold weather, rough road conditions that may cause intense vibration, high or low humidifies, dusty areas, etc. Therefore, in some embodiments, optical and/or electronic components of LiDAR system 300 (e.g., optics in transmitter 320, optical receiver and light detector 330, and steering mechanism 340) are disposed or configured in such a manner to maintain long term mechanical and optical stability. For example, components in LiDAR system 300 may be secured and sealed such that they can operate under all conditions a vehicle may encounter. As an example, an anti-moisture coating and/or hermetic sealing may be applied to optical components of transmitter 320, optical receiver and light detector 330, and steering mechanism 340 (and other components that are susceptible to moisture). As another example, housing(s), enclosure(s), and/or window can be used in LiDAR system 300 for providing desired characteristics such as hardness, ingress protection (IP) rating, self-cleaning capability, resistance to chemical and resistance to impact, or the like. In addition, efficient and economical methodologies for assembling LiDAR system 300 may be used to meet the LiDAR operating requirements while keeping the cost low.

It is understood by a person of ordinary skill in the art that FIG. 3 and the above descriptions are for illustrative purposes only, and a LiDAR system can include other functional units, blocks, or segments, and can include variations or combinations of these above functional units, blocks, or segments. For example, LiDAR system 300 can also include other components not depicted in FIG. 3, such as power buses, power supplies, LED indicators, switches, etc. Additionally, other connections among components may be present, such as a direct connection between light source 310 and optical receiver and light detector 330 so that light detector 330 can accurately measure the time from when light source 310 transmits a light pulse until light detector 330 detects a return light pulse.

These components shown in FIG. 3 are coupled together using communications paths 312, 314, 322, 332, 342, 352, and 362. These communications paths represent communication (bidirectional or unidirectional) among the various LiDAR system components but need not be physical components themselves. While the communications paths can be implemented by one or more electrical wires, busses, or optical fibers, the communication paths can also be wireless channels or open-air optical paths so that no physical communication medium is present. For example, in one exemplary LiDAR system, communication path 314 includes one or more optical fibers; communication path 352 represents an optical path; and communication paths 312, 322, 342, and 362 are all electrical wires that carry electrical signals. The communication paths can also include more than one of the above types of communication mediums (e.g., they can include an optical fiber and an optical path, or one or more optical fibers and one or more electrical wires).

Figure 5A:
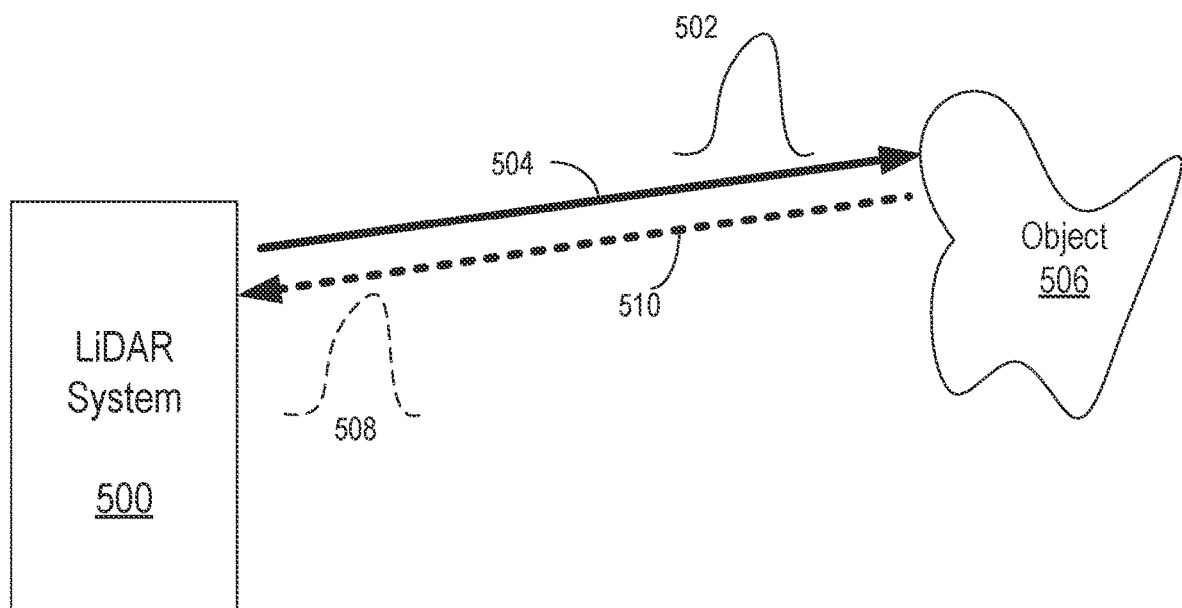
FIGS. 5A-5C illustrate an exemplary LiDAR system using pulse signals to measure distances to objects disposed in a field-of-view (FOV).

As described above, some LiDAR systems use the time-of-flight (TOF) of light signals (e.g., light pulses) to determine the distance to objects in a light path. For example, with reference to FIG. 5A, an exemplary LiDAR system 500 includes a laser light source (e.g., a fiber laser), a steering system (e.g., a system of one or more moving mirrors), and a light detector (e.g., a photon detector with one or more optics). LiDAR system 500 can be implemented using, for example, LiDAR system 300 described above. LiDAR system 500 transmits a light pulse 502 along light path 504 as determined by the steering system of LiDAR system 500. In the depicted example, light pulse 502, which is generated by the laser light source, is a short pulse of laser light. Further, the signal steering system of the LiDAR system 500 is a pulsed-signal steering system. However, it should be appreciated that LiDAR systems can operate by generating, transmitting, and detecting light signals that are not pulsed and derive ranges to an object in the surrounding environment using techniques other than time-of-flight. For example, some LiDAR systems use frequency modulated continuous waves (i.e., "FMCW"). It should be further appreciated that any of the techniques described herein with respect to time-of-flight based systems that use pulsed signals also may be applicable to LiDAR systems that do not use one or both of these techniques.

Referring back to FIG. 5A (e.g., illustrating a time-of-flight LiDAR system that uses light pulses), when light pulse 502 reaches object 506, light pulse 502 scatters or reflects to generate a return light pulse 508. Return light pulse 508 may return to system 500 along light path 510. The time from when transmitted light pulse 502 leaves LiDAR system 500 to when return light pulse 508 arrives back at LiDAR system 500 can be measured (e.g., by a processor or other electronics, such as control circuitry 350, within the LiDAR system). This time-of-flight combined with the knowledge of the speed of light can be used to determine the range/distance from LiDAR system 500 to the portion of object 506 where light pulse 502 scattered or reflected.

Figure 5B:
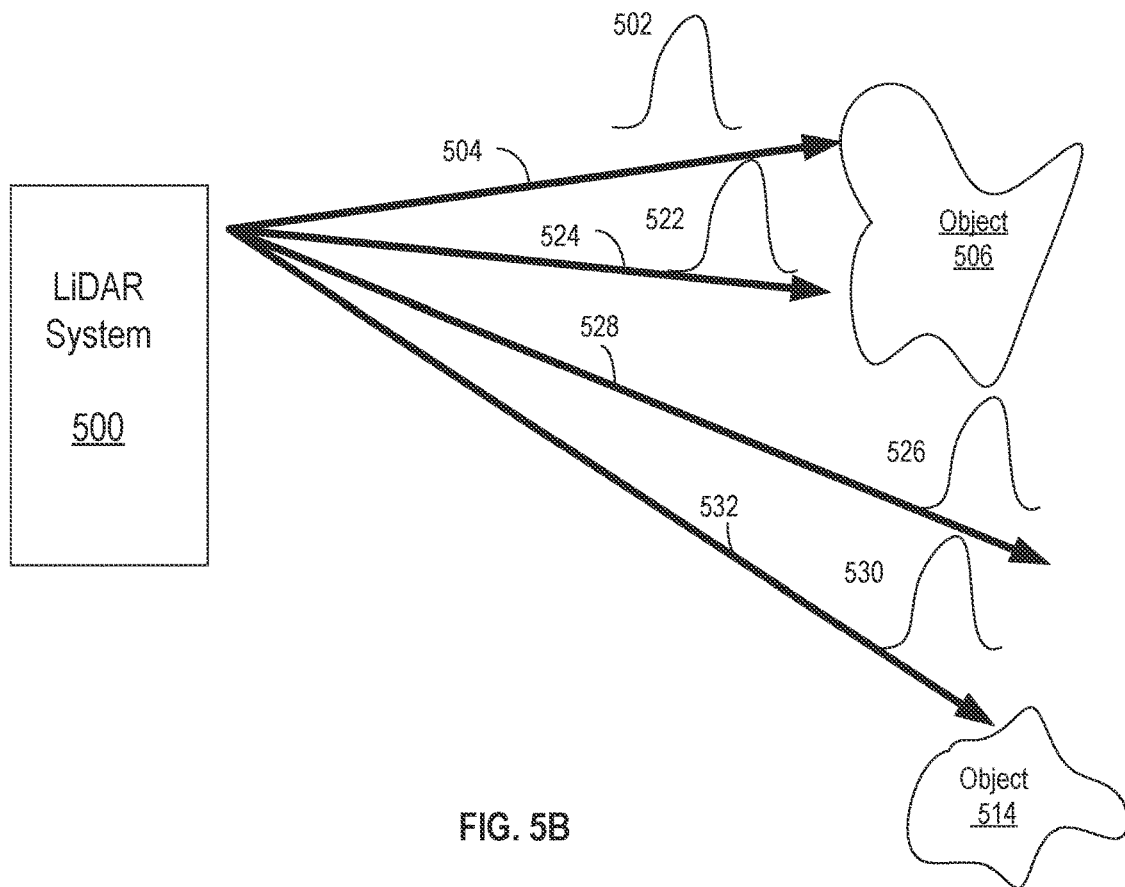
Figure 5C:
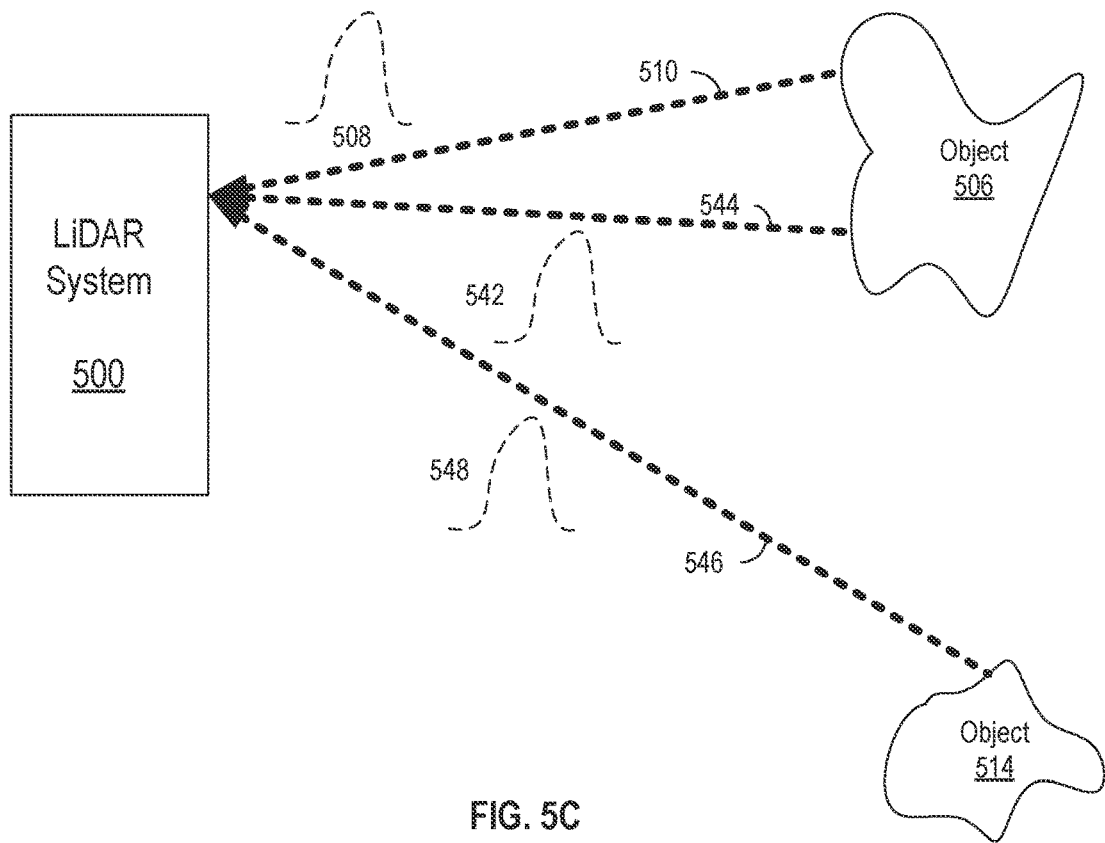

By directing many light pulses, as depicted in FIG. 5B, LiDAR system 500 scans the external environment (e.g., by directing light pulses 502, 522, 526, 530 along light paths 504, 524, 528, 532, respectively). As depicted in FIG. 5C, LiDAR system 500 receives return light pulses 508, 542, 548 (which correspond to transmitted light pulses 502, 522, 530, respectively). Return light pulses 508, 542, and 548 are generated by scattering or reflecting the transmitted light pulses by one of objects 506 and 514. Return light pulses 508, 542, and 548 may return to LiDAR system 500 along light paths 510, 544, and 546, respectively. Based on the direction of the transmitted light pulses (as determined by LiDAR system 500) as well as the calculated range from LiDAR system 500 to the portion of objects that scatter or reflect the light pulses (e.g., the portions of objects 506 and 514), the external environment within the detectable range (e.g., the field of view between path 504 and 532, inclusively) can be precisely mapped or plotted (e.g., by generating a 3D point cloud or images).

If a corresponding light pulse is not received for a particular transmitted light pulse, then it may be determined that there are no objects within a detectable range of LiDAR system 500 (e.g., an object is beyond the maximum scanning distance of LiDAR system 500). For example, in FIG. 5B, light pulse 526 may not have a corresponding return light pulse (as illustrated in FIG. 5C) because light pulse 526 may not produce a scattering event along its transmission path 528 within the predetermined detection range. LiDAR system 500, or an external system in communication with LiDAR system 500 (e.g., a cloud system or service), can interpret the lack of return light pulse as no object being disposed along light path 528 within the detectable range of LiDAR system 500.

In FIG. 5B, light pulses 502, 522, 526, and 530 can be transmitted in any order, serially, in parallel, or based on other timings with respect to each other. Additionally, while FIG. 5B depicts transmitted light pulses as being directed in one dimension or one plane (e.g., the plane of the paper), LiDAR system 500 can also direct transmitted light pulses along other dimension(s) or plane(s). For example, LiDAR system 500 can also direct transmitted light pulses in a dimension or plane that is perpendicular to the dimension or plane shown in FIG. 5B, thereby forming a 2-dimensional transmission of the light pulses. This 2-dimensional transmission of the light pulses can be point-by-point, line-by-line, all at once, or in some other manner. A point cloud or image from a 1-dimensional transmission of light pulses (e.g., a single horizontal line) can generate 2-dimensional data (e.g., (1) data from the horizontal transmission direction and (2) the range or distance to objects). Similarly, a point cloud or image from a 2-dimensional transmission of light pulses can generate 3-dimensional data (e.g., (1) data from the horizontal transmission direction, (2) data from the vertical transmission direction, and (3) the range or distance to objects). In general, a LiDAR system performing an n-dimensional transmission of light pulses generates (n+1) dimensional data. This is because the LiDAR system can measure the depth of an object or the range/distance to the object, which provides the extra dimension of data. Therefore, a 2D scanning by a LiDAR system can generate a 3D point cloud for mapping the external environment of the LiDAR system.

The density of a point cloud refers to the number of measurements (data points) per area performed by the LiDAR system. A point cloud density relates to the LiDAR scanning resolution. Typically, a larger point cloud density, and therefore a higher resolution, is desired at least for the region of interest (ROI). The density of points in a point cloud or image generated by a LiDAR system is equal to the number of pulses divided by the field of view. In some embodiments, the field of view can be fixed. Therefore, to increase the density of points generated by one set of transmission-receiving optics (or transceiver optics), the LiDAR system may need to generate a pulse more frequently. In other words, a light source with a higher pulse repetition rate (PRR) is needed. On the other hand, by generating and transmitting pulses more frequently, the farthest distance that the LiDAR system can detect may be limited. For example, if a return signal from a distant object is received after the system transmits the next pulse, the return signals may be detected in a different order than the order in which the corresponding signals are transmitted, thereby causing ambiguity if the system cannot correctly correlate the return signals with the transmitted signals.

To illustrate, consider an exemplary LiDAR system that can transmit laser pulses with a repetition rate between 500 kHz and 1 MHz. Based on the time it takes for a pulse to return to the LiDAR system and to avoid mix-up of return pulses from consecutive pulses in a conventional LiDAR design, the farthest distance the LiDAR system can detect may be 300 meters and 150 meters for 500 kHz and 1 MHz, respectively. The density of points of a LiDAR system with 500 kHz repetition rate is half of that with 1 MHz. Thus, this example demonstrates that, if the system cannot correctly correlate return signals that arrive out of order, increasing the repetition rate from 500 kHz to 1 MHz (and thus improving the density of points of the system) may reduce the detection range of the system. Various techniques are used to mitigate the tradeoff between higher PRR and limited detection range. For example, multiple wavelengths can be used for detecting objects in different ranges. Optical and/or signal processing techniques are also used to correlate between transmitted and return light signals.

Various systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Various systems, apparatus, and methods described herein may be implemented using computers operating in a client-server relationship. Typically, in such a system, the client computers are located remotely from the server computers and interact via a network. The client-server relationship may be defined and controlled by computer programs running on the respective client and server computers. Examples of client computers can include desktop computers, workstations, portable computers, cellular smartphones, tablets, or other types of computing devices.

Various systems, apparatus, and methods described herein may be implemented using a computer program product tangibly embodied in an information carrier, e.g., in a non-transitory machine-readable storage device, for execution by a programmable processor; and the method processes and steps described herein may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 6:
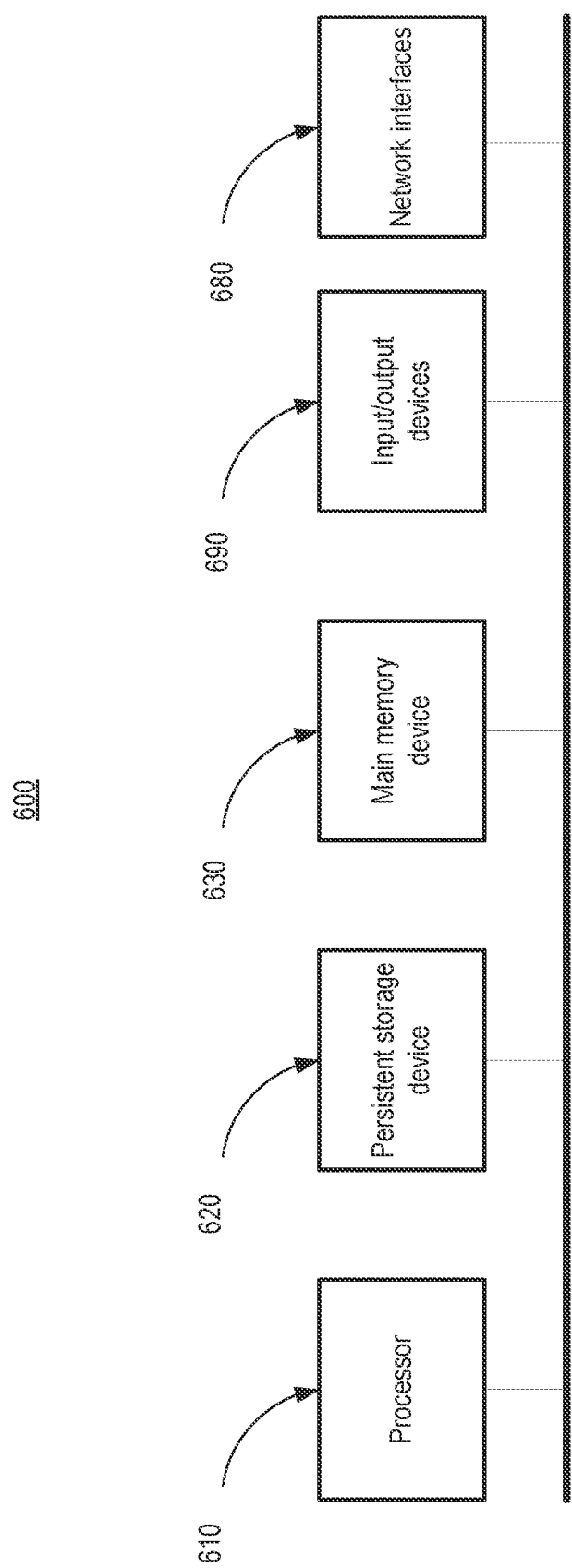
FIG. 6 is a block diagram illustrating an exemplary apparatus used to implement systems, apparatus, and methods in various embodiments.

A high-level block diagram of an exemplary apparatus that may be used to implement systems, apparatus and methods described herein is illustrated in FIG. 6. Apparatus 600 comprises a processor 610 operatively coupled to a persistent storage device 620 and a main memory device 630. Processor 610 controls the overall operation of apparatus 600 by executing computer program instructions that define such operations. The computer program instructions may be stored in persistent storage device 620, or other computer-readable medium, and loaded into main memory device 630 when execution of the computer program instructions is desired. For example, processor 610 may be used to implement one or more components and systems described herein, such as control circuitry 350 (shown in FIG. 3), vehicle perception and planning system 220 (shown in FIG. 2), and vehicle control system 280 (shown in FIG. 2). Thus, the methods described herein can be defined by the computer program instructions stored in main memory device 630 and/or persistent storage device 620 and controlled by processor 610 executing the computer program instructions. For example, the computer program instructions can be implemented as computer executable code programmed by one skilled in the art to perform an algorithm defined by the methods described herein. Accordingly, by executing the computer program instructions, the processor 610 executes an algorithm defined by the methods described herein. Apparatus 600 also includes one or more network interfaces 680 for communicating with other devices via a network. Apparatus 600 may also include one or more input/output devices 690 that enable user interaction with apparatus 600 (e.g., display, keyboard, mouse, speakers, buttons, etc.).

Processor 610 may include both general and special purpose microprocessors and may be the sole processor or one of multiple processors of apparatus 600. Processor 610 may comprise one or more central processing units (CPUs), and one or more graphics processing units (GPUs), which, for example, may work separately from and/or multi-task with one or more CPUs to accelerate processing, e.g., for various image processing applications described herein. Processor 610, persistent storage device 620, and/or main memory device 630 may include, be supplemented by, or incorporated in, one or more application-specific integrated circuits (ASICs) and/or one or more field programmable gate arrays (FPGAs).

Persistent storage device 620 and main memory device 630 each comprise a tangible non-transitory computer readable storage medium. Persistent storage device 620, and main memory device 630, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 690 may include peripherals, such as a printer, scanner, display screen, etc. For example, input/output devices 690 may include a display device such as a cathode ray tube (CRT), plasma or liquid crystal display (LCD) monitor for displaying information to a user, a keyboard, and a pointing device such as a mouse or a trackball by which the user can provide input to apparatus 600.

Any or all of the functions of the systems and apparatuses discussed herein may be performed by processor 610, and/or incorporated in, an apparatus or a system such as LiDAR system 300. Further, LiDAR system 300 and/or apparatus 600 may utilize one or more neural networks or other deep-learning techniques performed by processor 610 or other systems or apparatuses discussed herein.

One skilled in the art will recognize that an implementation of an actual computer or computer system may have other structures and may contain other components as well, and that FIG. 6 is a high-level representation of some of the components of such a computer for illustrative purposes.

Figure 8:
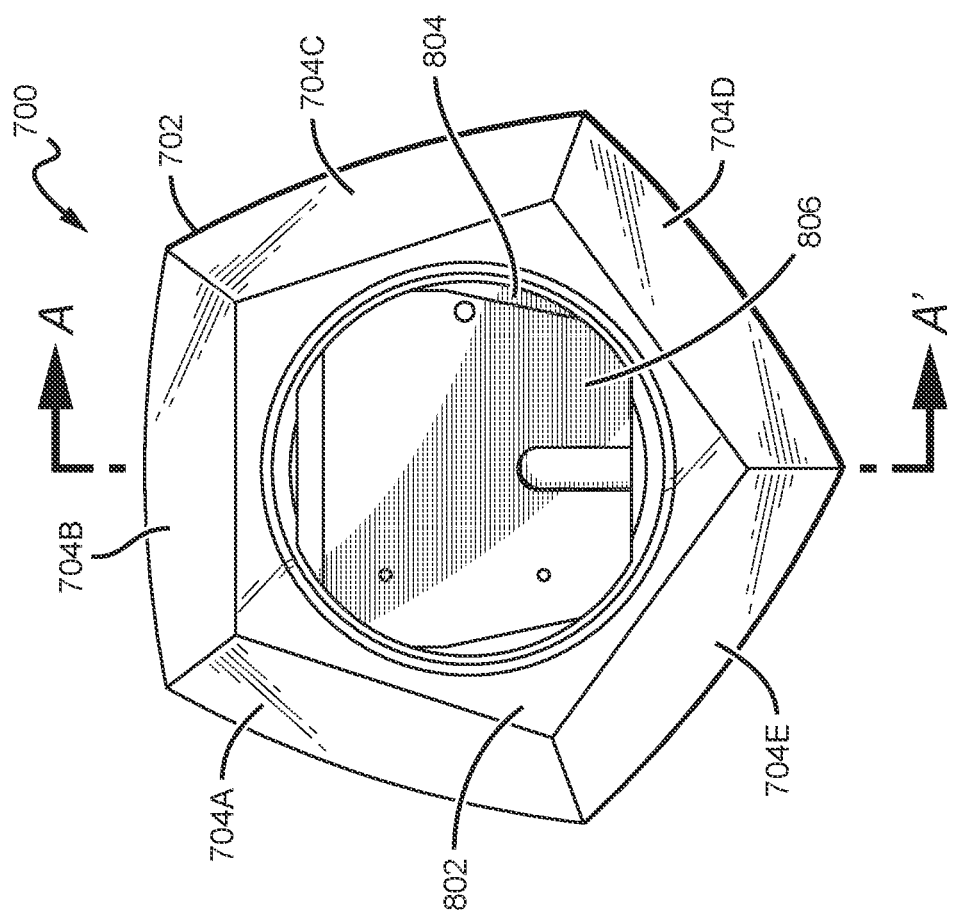
FIG. 8 is a bottom view of the exemplary rotatable optical reflector device according to some embodiments.
Figure 7:
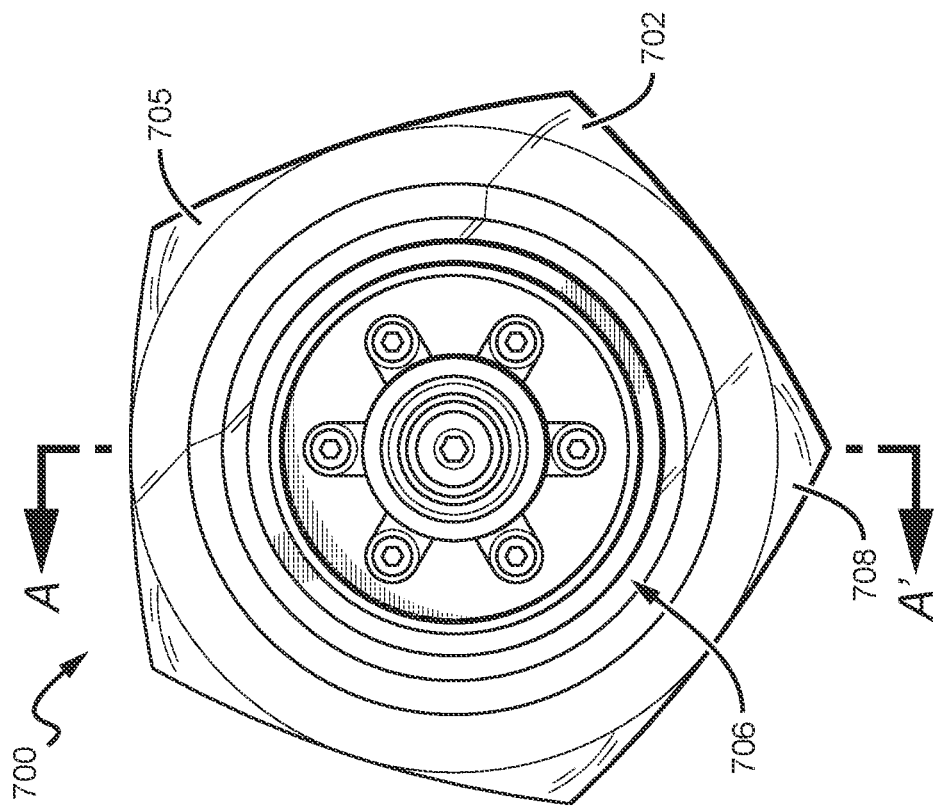
FIG. 7 is a top view of an exemplary rotatable optical reflector device according to some embodiments.
Figure 9:
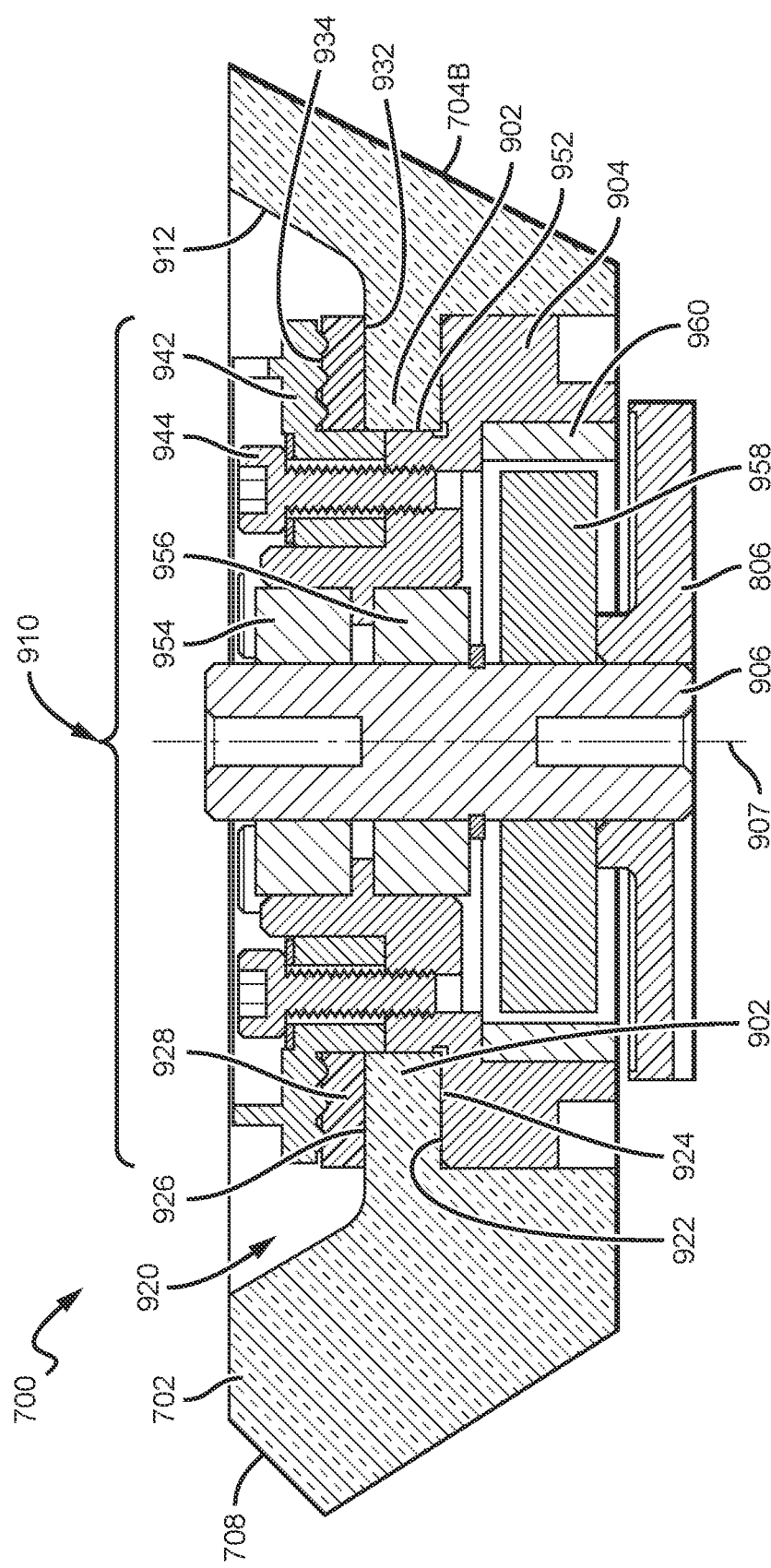
FIG. 9 is a cross-sectional view of the exemplary rotatable optical reflector device according to some embodiments.
Figure 10:
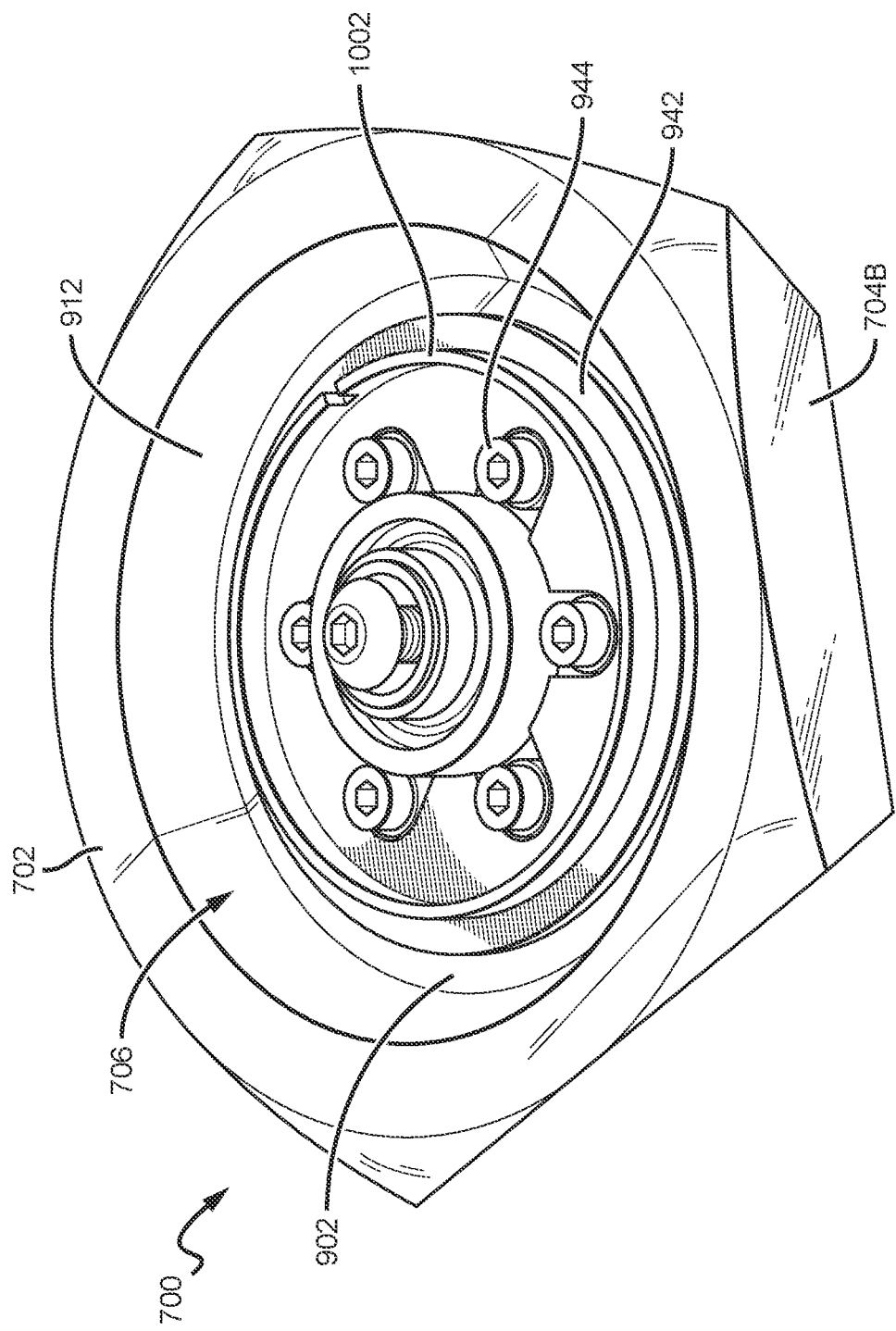
FIG. 10 is a perspective view of the exemplary rotatable optical reflector device according to some embodiments.
Figure 11:
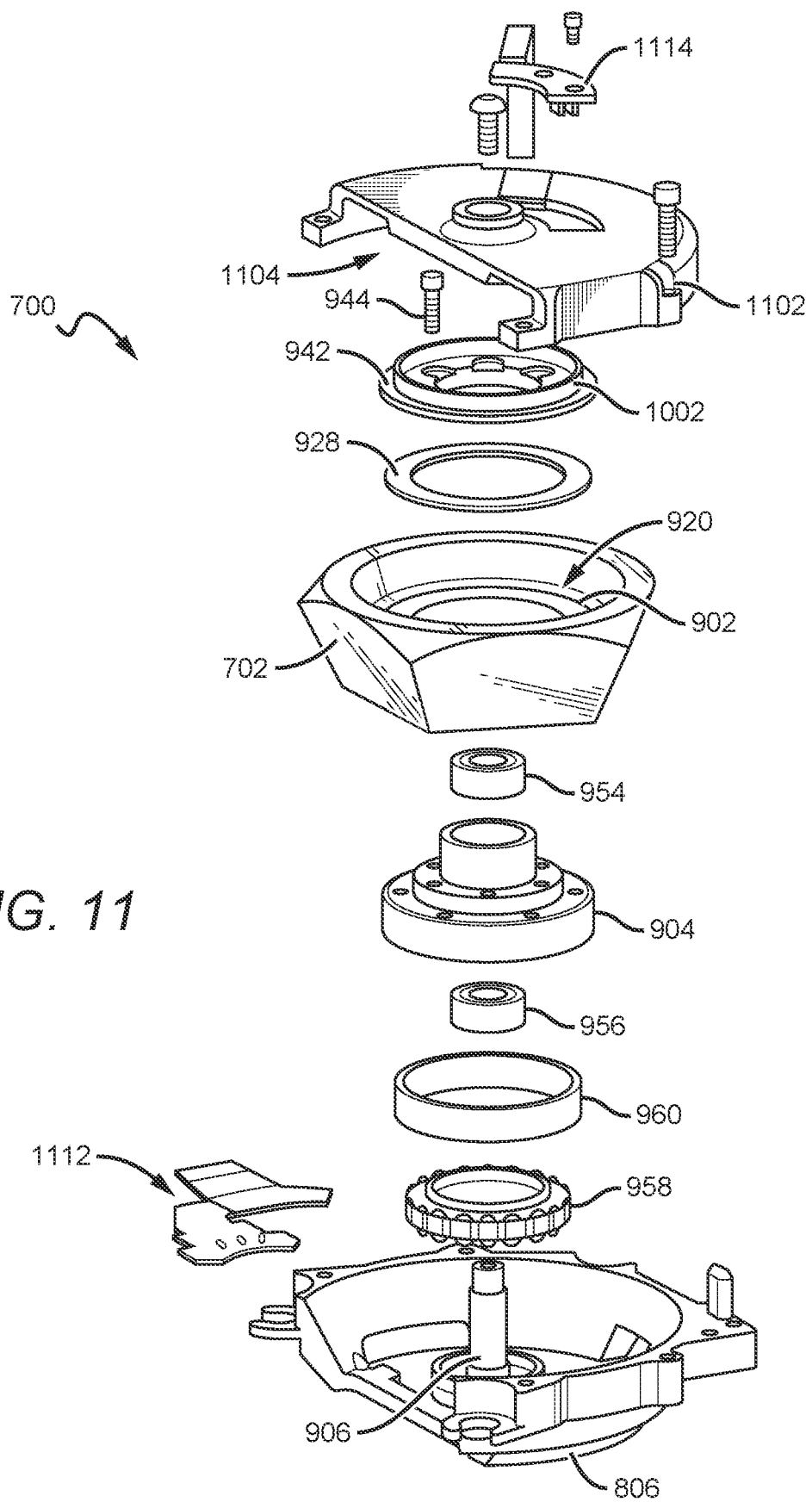
FIG. 11 is an exploded view of the exemplary rotatable optical reflector device according to some embodiments.

FIG. 7 illustrates a top view of an exemplary rotatable optical reflector device 700. FIG. 8 illustrates a bottom view of the exemplary rotatable optical reflector device 700. FIG. 9 illustrates a cross-sectional view of rotatable optical reflector device 700 along the cross-section position A-A' shown in FIGS. 7 and 8. FIG. 10 illustrates a perspective view of rotatable optical reflector device 700. FIG. 11 illustrates an exploded view of rotatable optical reflector device 700. FIGS. 7-11 are described together and the same elements are referred to by using the same numbers in FIGS. 7-11. Rotatable optical reflector device 700 can be, for example, a part of steering mechanism 340 shown in FIG. 3.

Referencing FIGS. 7-11, rotatable optical reflector device 700 comprises a glass-based optical reflector 702. Optical reflector 702 can be, for example, a polygon mirror. In one embodiment, glass-based optical reflector 702 comprises a polygon-shaped top surface 705, a polygon-shaped bottom surface 802, and a plurality of reflective surfaces 704A-E (collectively as 704). Reflective surfaces 704 form outer side surfaces of optical reflector 702. Reflective surfaces 704 reflect light and are also referred to as facets of optical reflector 702. Top surface 705 and bottom surface 802 may or may not be reflective. The top view of optical reflector 702 in FIG. 7 shows a pentagon-shaped top surface 705. In one embodiment, top surface 705 may be a flat or substantially flat surface comprising five edges. Top surface 705 may also be a curved surface having chamfered or beveled corners such as corner 708. The five edges of top surface 705 form a pentagon shape. The edges of top surface 705 may be straight edges or curved edges.

It is understood that glass-based optical reflector 702 can have a polygon-shaped top surface comprising any number of edges (e.g., 3, 4, 5, 6, 7, 8, etc.). Correspondingly, optical reflector 702 can have a triangle-, square-, pentagon-, hexagon-, heptagon-, or octagon-shaped top surface 705; and 3, 4, 5, 6, 7, 8 side surfaces, respectively.

The bottom view of optical reflector 702 in FIG. 8 illustrates a pentagon-shaped bottom surface 802. In FIG. 8, bottom surface 802 is a flat or substantially flat surface comprising five edges. Bottom surface 802 may also be a curved surface. The five edges of bottom surface 802 form a pentagon shape. The edges of the bottom surface 802 may be straight edges or curved edges. It is understood that glass-based optical reflector 702 can have a polygon-shaped bottom surface comprising any number of edges (e.g., 3, 4, 5, 6, 7, 8, etc.). Correspondingly, glass-based optical reflector 702 can have a triangle-, square-, pentagon-, hexagon-, heptagon-, or octagon-shaped bottom surface. As shown in FIGS. 8 and 9, polygon-shaped bottom surface 802 includes an opening 804 for installing a motor assembly 910. Opening 804 can be a round-shaped opening or any other shaped opening (e.g., rectangle, square, polygon, oval, or the like).

In some embodiments, motor assembly 910 includes a motor base 806 mounted to a motor shaft 906. A part of, or entire, motor base 806 can be disposed underneath and/or surround optical reflector 702, as illustrated in FIGS. 9 and 11, thereby providing support to optical reflector 702.

Referencing FIGS. 8-10, optical reflector 702 comprises a plurality of reflective surfaces (e.g., surfaces 704A-E) forming its outer side surfaces. The side surfaces share their top edges with top surface 705 and share their bottom edges with bottom surface 802. In some embodiments, a side surface has a trapezoidal-type shape. Using reflective surface 704B as an example, the top edge of reflective surface 704B is longer than its bottom edge, thereby forming a trapezoidal-type shape. Similarly, in some embodiments, other reflective surfaces may also have longer top edges and shorter bottom edges. As a result, at least one of reflective surfaces 704A-E (collectively 704) forms a tilt angle with respect to the rotational axis of optical reflector 702. A tilt angle can be between 0-90 degrees (e.g., 27 degrees). A tilt angle is also referred to as a facet angle. In other words, one or more of reflective surfaces 704 are not parallel with the rotational axis of optical reflector 702. Such a rotational axis is shown as axis 907 in FIG. 9. Rotational axis 907 of optical reflector 702 is parallel or substantially parallel to motor shaft 906. As illustrated in FIG. 9, reflective surface 704B and rotational axis 907 form a tilt angle. Similarly, other reflective surfaces 704 may also form their respective tilt angles with rotational axis 907. The tilt angles of different reflective surfaces 704A-E may or may not be the same.

Forming tilt angles between one or more of reflective surfaces 704 and rotational axis 907 of optical reflector 702 can provide a more compact LiDAR system. For example, by forming tilt angles, a Galvanometer mirror or any other optical component that redirects light beams from (or to) optical reflector 702 can be placed at a lower (or higher) vertical position instead of being placed side-by-side with the optical reflector 702. This configuration saves space and makes the LiDAR system more compact. As a result, the LiDAR system can be more easily fit into small spaces in a vehicle. In some embodiments, the tilt angles of different reflective surfaces 704A-E can be the same, as illustrated in FIGS. 7-10. In some embodiments, they can be different, thereby forming a variable angle optical reflector.

In some embodiments, reflective surfaces 704 comprise mirrors for reflecting or redirecting light. The mirrors are disposed at the outer side surfaces of glass-based optical reflector 702. In some embodiments, optical reflector 702 is made from a glass material and the side surfaces of optical reflector 702 are coated with reflective materials to make them reflective. In some embodiments, reflective surfaces 704 can also be made reflective by mechanically or adhesively attaching mirrors to the side surfaces of optical reflector 702. In some embodiments, the outer side surfaces of the optical reflector 702 are integral parts of optical reflector 702. For example, the entire optical reflector 702 can be made with reflective material so that each of the outer side surfaces (e.g., reflective surfaces 704) of optical reflector 702 is reflective. In some embodiments, only the outer side surfaces of optical reflector 702 are made reflective but other parts of optical reflector 702 are not made reflective.

As shown in the cross-sectional view of FIG. 9 and the exploded view of FIG. 11, optical reflector 702 has an inner opening 920, within which at least a part of motor assembly 910 is disposed. Motor assembly 910 comprises a motor rotor body 904. Motor rotor body 904 can be a metal-based piece formed by using aluminum, iron, copper, steel, an alloy, and/or any other desired metal-based materials. In one embodiment, motor rotor body 904 is made from aluminum, which has a CTE of about $22 \times 10^{-6}/°$ K.

As shown in FIG. 9, motor rotor body 904 is at least partially disposed within inner opening 920 of optical reflector 702 and mounted to optical reflector 702. FIG. 9 illustrates one embodiment where motor rotor body 904 is mechanically mounted to optical reflector 702 using a flange 902 of optical reflector 702. Flange 902 can be an integral part of optical reflector 702. Flange 902 may also be a detachable part that is mechanically mounted or attached to optical reflector 702. In one embodiment, flange 902 extends from an inner sidewall 912 of optical reflector 702 towards motor rotor body 904. In some embodiments, flange 902 includes a first mounting surface 922 that is in contact with a reference surface 924 of the motor rotor body 904. Reference surface 924 can be a surface that is substantially perpendicular (e.g., about 90 degrees) to the axis along a longitudinal direction of motor shaft 906. As illustrated in FIG. 9, reference surface 924 is perpendicular to axis 907, about which motor rotor body 904 and optical reflector 702 rotate. Flange 902 further includes a second mounting surface 926 that is in contact with an elastomer piece 928. Elastomer piece 928 can have a ring shape as shown in FIG. 11. Flange 902 also has a ring-shaped portion that is formed between first mounting surface 922 and second mounting surface 926. The ring-shaped elastomer piece 928 thus matches with the shape of the ring-shaped portion of flange 902. As such, the entire elastomer piece 928 or a substantial portion thereof can be disposed on, and in contact with, flange 902.

FIG. 9 illustrates that elastomer piece 928 has a first surface 932 and a second surface 934. First surface 932 can be the bottom surface of the ring-shaped elastomer piece 928. Second surface 934 can be the top surface of the ring-shaped elastomer piece 928. As shown in FIG. 9, first surface 932 of elastomer piece 928 is in contact with second mounting surface 926 of the flange 902. FIGS. 9 and 11 further illustrate that a clamp mechanism 942 is in contact with second surface 934 of elastomer piece 928 and is configured to compress elastomer piece 928. Elastomer piece 928 is thus disposed between clamping mechanism 942 and flange 902. Clamping mechanism 942 may be, for example, a clamping ring.

As described above, during operation, a LiDAR system including optical reflector device 700 may be exposed to temperature variations, vibration, shock, and/or other environmental conditions. These environmental conditions may cause internal stress in optical reflector device 700. For example, a CTE mismatch between the glass-based optical reflector 702 and the metal-based motor rotor body 904 (and other metal parts of optical reflector device 700) may cause stress between these components. Such stress may be unevenly distributed and may negatively impact the performance of optical reflector 702. For example, the CTE mismatch may cause optical reflector 702 to wobble while rotating, which in turn causes the light beams scanned by optical reflector 702 to deviate from their intended directions or courses. Elastomer piece 928 is disposed and configured to absorb the stress caused by the various environmental conditions, e.g., the CTE mismatch between glass and metal, the vibration, and the shock. In some embodiments, elastomer piece 928 are made from polymer-based materials and/or rubber-based materials. For example, elastomer piece 928 can be made from an ethylene propylene diene monomer (EPDM) based rubber.

The materials and/or dimensions of elastomer piece 928 can be configured to have a proper hardness or softness to optimize its ability to absorb the stress caused by various environmental conditions. For example, elastomer piece 928 can be made from a material having a hardness in the range of about 40 A-75 A durometers. The dimensions of elastomer piece 928 can be configured to have an inner diameter of about 32 mm, an outer diameter of about 44 mm, and a thickness of about 1.3-3 mm. It is understood that the dimensions of elastomer piece 928 can be configured to have any desired values or ranges for optimizing its capability of absorbing the stress caused by various environmental conditions. In one embodiment, the diameters of the elastomer piece 928 may change according to the dimensions of the flange 902 and/or the overall dimensions of optical reflector 702. The thickness of the elastomer piece 928 may change based on the required level of stress absorption or reduction. For instance, the thickness may increase if the operating temperature range of the LiDAR system increases and/or if the LiDAR system is expected to operate under severe shock and vibration conditions (e.g., the elastomer piece may be thicker in a LiDAR system mounted to a vehicle capable of being driven off-road than a LiDAR system mounted to a vehicle intended for only paved road driving).

In some embodiments, the type and/or dimensions of elastomer piece 928 are selected to reduce the likelihood of damaging the optical reflector 702 (e.g., glass fracturing) caused by the CTE mismatch between glass-based flange 902 and metal-based motor rotor body 904. For example, the CTE of glass-based optical reflector 702 (and therefore its flange 902) is about $7.1 \times 10^{-6}/°$ K. The CTE of metal-based motor rotor body 904 is about $22 \times 10^{-6}/°$ K. In other words, the CTE of the motor rotor body 904 is about three times of that of the glass-based optical reflector 702. As a result, the temperature variation may cause the glass-based optical reflector 702 to fracture or even break if the stress caused by the CTE mismatch is not mitigated. For instance, if motor rotor body 904 and optical reflector 702 are glued together without leaving much room for thermal expansion, optical reflector 702 may become fractured after exposing to a certain number of temperature variation cycles. Adding elastomer piece 928 to optical reflector device 700 can effectively prevent or significantly reduce the likelihood of damaging the glass-based optical reflector 702 caused by the CTE mismatch. By adding elastomer piece 928, the CTE mismatch caused by temperature variation is compensated.

Moreover, adding elastomer piece 928 results in no or only a small amount of changing of clamping force provided by clamping mechanism 942. Therefore, adding elastomer piece 928 has no or minimum impact to the mechanical robustness, stability, reliability, and performance of optical reflector 702. In one embodiment, elastomer piece 928 can operate as a damping piece to absorb shock and/or vibration, thereby providing additional protection to optical reflector 702. Optical reflector 702 is often a key component of a LiDAR system used to scan light beams to the FOV for detecting the surrounding environment. Thus, preventing or reducing the likelihood of damage to optical reflector 702 is important.

As shown in FIGS. 9 and 11, clamping mechanism 942 compresses elastomer piece 928 to flange 902, which in turn applies force to motor rotor body 904. This way, optical reflector 702, via flange 902, is secured to motor rotor body 904 by the friction generated by the compression force. The amount of the compression can be configured to be sufficient under all foreseeable operating conditions (e.g., high speed rotation, temperature variation, humidity variations, road conditions, or the like). In one embodiment, clamping mechanism 942 is a clamping ring. In some embodiments, clamping mechanism 942 comprises one or more fastening mechanisms 944 (e.g., screws with or without lock washers). Fastening mechanisms 944 are used to apply compression forces to elastomer piece 928. In operation of the LiDAR system, the movement of the metal-based motor rotor body 904 causes the glass-based optical reflector 702 to rotate at a very high speed in a range of about 2000-9000 revolutions per minute (rpm). Thus, clamping mechanism 942 needs to be configured to apply a proper compression force to secure optical reflector 702 to motor rotor body 904 under all operating conditions.

As shown in FIG. 10, the compression force can be applied by using multiple fastening mechanisms 944 disposed around clamping mechanism 942 (e.g., the clamping ring). In FIG. 10, for example, fastening mechanisms 944 include six screws with lock washers. The six screws are distributed evenly around the clamping ring. In some embodiments, the six screws are tightened such that the same or substantially the same amount of compression forces are applied to elastomer piece 928. In some embodiments, the six screws are adjustable individually or as a group such that optical reflector 702 is secured and capable of rotating without wobbling (or within a tolerable wobbling range). For example, some screws may be tightened more than the others to fine tune the amount of compression forces applied at any given point of elastomer piece 928. Wobbling can be eliminated or substantially reduced by such fine tuning of the compression forces using the fastening mechanisms 944. It is understood that clamping mechanism 942 may include any number of fastening mechanisms 944 distributed in any manner to satisfy the performance requirements of optical reflector 702.

Furthermore, fastening mechanisms 944 can be configured to apply any amount of desired compression forces to elastomer piece 928 such that elastomer piece 928 absorbs the proper amount of internal stress caused by variations of environment conditions (e.g., temperature changes). For instance, using fastening mechanism 944, the compression force applied to elastomer piece 928 is configured or adjusted within a predetermined range such that elastomer piece 928 can absorb the internal stress caused by the glass-metal CTE mismatch within a certain range of temperature variations. Excessive amount of compression force reduces the elastomer piece 928's ability to absorb the internal stress. On the other hand, insufficient compression force may not generate enough friction for securing optical reflector 702 to motor rotor body 904. By adjusting fastening mechanisms 944 (individually or as a group), the proper amount of compression force can be provided to elastomer piece 928.

In some embodiments, as shown in FIG. 9, elastomer piece 928 comprises first surface 932 and second surface 934. First surface 932 can be a flat or substantially flat surface. Second surface 934 can be a rugged surface. The rugged surface of elastomer piece 928 generates extra contacting surface area and therefore increases the friction between clamping mechanism 942 and elastomer piece 928. The rugged surface thus enhances securing of optical reflector 702 and improves absorption of the internal stress caused by variation of environmental conditions. In some embodiments, the rugged surface of elastomer piece 928 also generates extra space for absorbing the internal stress caused by the glass-metal CTE mismatch due to large temperature variations.

In some embodiments, optical reflector device 700 comprises a gap (not shown) disposed between an inner vertical surface of flange 902 and motor rotor body 904. For example, the gap can be configured to be disposed along vertical surface 952 of flange 902. The gap can be formed by configuring the outer diameter of the upper portion of motor rotor body 904 to be slightly smaller than the inner diameter of flange 902. The size of the gap can be predetermined to further compensate the CTE mismatch between the glass-based flange 902 and the metal-based motor rotor body 904. In one embodiment, the gap is in the range of about 25-45 µm. The gap further reduces the internal stress caused by variations of different environmental conditions.

Referencing FIGS. 9 and 11, motor assembly 910 further comprises a motor shaft 906 disposed in one or more bearings 954 and 956. Bearings 954 and 956 are disposed inside motor rotor body 904. Motor assembly 910 further comprises a motor stator 958 and a magnetic ring 960. Motor stator 958 has electrical windings. Motor stator 958 is configured to be disposed inside magnetic ring 960, which is in turn disposed inside the lower portion of motor rotor body 904. When motor assembly 910 is provided with electricity, magnetic forces are generated via the electrical windings mounted on motor stator 958. The magnetic forces cause magnetic ring 960 to rotate, which in turn rotates motor rotor body 904. The rotation of motor rotor body 904 causes optical reflector 702 to rotate.

Referencing FIGS. 9 and 10, in one embodiment, the glass-based optical reflector 702 and the metal-based motor rotor body 904 are substantially concentric with respect to a rotational axis (e.g., axis 907) along a longitudinal direction of motor shaft 906. For example, the error of concentricity can be controlled to be less than a preconfigured threshold (e.g., about 20-25 µm). If the error of concentricity is larger than the threshold, the rotation of the optical reflector 702 may be imbalanced (e.g., off-centered) because the weight center of optical reflector 702 is shifted with respect to that of motor rotor body 904. Such a shift may or may not impact the LiDAR scanning performance but may affect the overall robustness and reliability of optical reflector device 700. In some embodiments, optical reflector 702 and motor rotor body 904 are assembled in a manner to minimize wobbling during the rotation of optical reflector 702. For example, to prevent wobbling, the rotational axis of optical reflector 702 and the rotational axis of motor rotor body 904 (which may be the same axis or substantially the same if concentricity is controlled to be within a threshold) should be configured to be perpendicular to mounting surface 922 and reference surface 924, respectively. Mounting surface 922 and reference surface 924 are configured to be parallel or substantially parallel to each other. In some embodiments, wobbling is considered to be minimized or controlled to be within a threshold if the variation of facet angles is less than or equal to about ±0.01 degree. For example, if the facet angles for the five different reflective surfaces (also referred to as facets) of optical reflector 702 are 27°, 27.002°, 26.994°, 27.005°, and 26.998°), the wobbling can be considered as minimized or acceptable. If the wobbling is large, it causes optical reflector 702 to have error in scanning light beams to the FOV, thereby negatively impacting the performance of optical reflector 702 and the entire LiDAR system.

Referencing FIGS. 10 and 11, optical reflector device 700 further comprises an index encoder 1002, which is attached to clamping mechanism 942. As shown in FIG. 11, in one embodiment, index encoder 1002 communicates with an encoder receiver and processing circuitry 1114. Index encoder 1002 is also referred to as a position encoder. By attaching to clamping mechanism 942, index encoder 1002 rotates when optical reflector 702 rotates, providing an output indicating the rotational statuses and/or parameters of optical reflector 702. In the embodiment shown in FIGS. 10 and 11, index encoder 1002 comprises a ring-shaped wall with a notch. The notch can pass optical signals for deriving the rotational statuses and/or parameters of optical reflector 702. For example, when optical reflector 702 rotates a full circle to the position of the notch, an optical signal that is blocked by the ring-shaped wall can pass the notch. Therefore, by tracking the time interval between the two consecutive signals passing the notch, the rotational speed of optical reflector 702 can be calculated. The optical signal output of index encoder 1002 is provided to encoder receiver and processing circuitry 1114, which generates voltage pulses, rotational speeds, and/or absolute angular positions of optical reflector 702. In one embodiment, index encoder 1002 may be a rotary encoder. Encoder receiver and processing circuitry 1114 converts an angular position or motion of optical reflector 702 to an electrical signal. The position of optical reflector 702 corresponds to, for example, a scanning position/angle (e.g., a horizontal or vertical scanning position/angle) of optical reflector device 700. Thus, index encoder 1002 and encoder receiver and processing circuitry 1114 generate data that can be used to determine optical reflector 702's angular position, rotational speed, phase, direction, or the like.

In some embodiments, referencing FIG. 11, optical reflector device 700 further comprises a Hall-effect sensor and processing circuitry 1112. The Hall-effect sensor and processing circuitry 1112 detects the presence and the magnitude of a magnetic field using the Hall effect. The output voltage of the Hall-effect sensor is directly proportional to the strength of the field. Thus, the Hall-effect sensor and processing circuitry 1112 can be used to detect the angular position, rotational speed, and phases, rotational directions, etc. of optical reflector 702. For example, one or more magnets (not shown) can be installed in optical reflector device 700 to rotate together with optical reflector 702. When the magnets passing through Hall-effect sensor and processing circuitry 112, electrical signals are generated and processed to compute various parameters of optical reflector 702. In some embodiments, a Hall-effect sensor is more sensitive and accurate than an index encoder. And therefore, optical reflector device 700 may use only the Hall-effect sensor during operation. The index encoder can be used, for example, during calibration of the LiDAR system. In some embodiments, optical reflector device 700 can use both the index encoder and the Hall-effect sensor for position encoding.

In some embodiments, motor assembly 910 further comprises motor windings for generating magnetic forces to rotate the motor rotor body 904. As described above, the motor windings may be attached to motor stator 958 as shown in FIG. 11. In some embodiments, the index encoder processing circuitry, the Hall-effect sensor processing circuitry, and/or the motor windings are integrated on a printed circuit board (PCB) attached to, or communicating with, motor stator 958. In some embodiments, the index encoder processing circuitry, the Hall-effect sensor processing circuitry, and the motor windings may be separate components. For example, the index encoder processing circuitry and the Hall-effect sensor processing circuitry may use different PCBs.

Referencing FIG. 11, in some embodiments, optical reflector device 700 further comprises a fairing 1102. Fairing 1102 is disposed around the optical reflector 702 to at least partially enclose optical reflector 702 and other components of motor assembly 910 (e.g., clamping mechanism 1002). In one embodiment, fairing 1102 comprises a housing, walls, covers, and/or other structures to at least partially enclose optical reflector 702 and motor assembly 910. Fairing 1102 has an opening 1104 at one side as shown in FIG. 11. In one embodiment, fairing 1102 comprises at least a portion of a cylinder or a cone. An axial direction of fairing 1102 is substantially parallel to an axial direction of optical reflector 702. Fairing 1102 can be concentric or eccentric to optical reflector 702. Fairing 1102, alone or in combination with motor base 806, encloses the optical reflector 702 to form a housing except at the side of opening 1104. Opening 1104 allows light beams to be directed in and/or out of fairing 1102 to allow optical communication with optical reflector 702. The enclosing of optical reflector 702 by using one or both of fairing 1102 and motor base 806 reduces the air friction caused by the high-speed rotation of optical reflector 702, thereby effectively generating a local vacuum surrounding optical reflector 702. The housing formed by fairing 1120 and/or motor base 806 thus facilitates a smoother rotation of optical reflector 702 (e.g., reduces the variations of speed between rotations caused by air friction or turbulence). In turn, the smoother rotation improves the overall light scanning performance and energy efficiency of optical reflector 702.

Various exemplary embodiments are described herein. Reference is made to these examples in a non-limiting sense. They are provided to illustrate more broadly applicable aspects of the disclosed technology. Various changes may be made, and equivalents may be substituted without departing from the true spirit and scope of the various embodiments. In addition, many modifications may be made to adapt a particular situation, material, composition of matter, process, process act(s) or step(s) to the objective(s), spirit or scope of the various embodiments. Further, as will be appreciated by those with skill in the art, each of the individual variations described and illustrated herein has discrete components and features which may be readily separated from or combined with the features of any of the other several embodiments without departing from the scope or spirit of the various embodiments.

What is claimed is:

1. A rotatable optical reflector device of a Light Detection and Ranging (LiDAR) scanning system used in a motor vehicle, comprising:
    a glass-based optical reflector including a plurality of reflective surfaces and a flange;
    a metal-based motor rotor body at least partially disposed in an inner opening of the glass-based optical reflector, wherein:
        the flange extends from an inner sidewall of the glass-based optical reflector towards the metal-based motor rotor body, wherein the flange is not in contact with a motor shaft,
        the flange includes a first mounting surface that is in contact with a reference surface of the metal-based motor rotor body, wherein an axis along a longitudinal direction of the motor shaft is substantially perpendicular to the reference surface of the metal-based motor rotor body;
    an elastomer piece having a first surface and a second surface, the first surface of the elastomer piece being in contact with a second mounting surface of the flange, wherein the elastomer piece is not in contact with the motor shaft, and the elastomer piece is on top of the flange; and
    a clamping mechanism compressing the elastomer piece at the second surface of the elastomer piece, wherein movement of the metal-based motor rotor body causes the glass-based optical reflector to optically scan light in a field-of-view of the LiDAR scanning system.

2. The device of claim 1, wherein the glass-based optical reflector comprises a polygon-shaped bottom surface, the polygon-shaped bottom surface including an opening.

3. The device of claim 2, wherein the polygon-shaped bottom surface comprises five or more edges.

4. The device of claim 1, wherein the plurality of reflective surfaces comprises a plurality of mirrors disposed at, or formed as an integral part of, outer sider surfaces of the glass-based optical reflector.

5. The device of claim 1, wherein the movement of the metal-based motor rotor body causes the glass-based optical reflector to rotate at a speed in a range of about 2000-9000 revolutions per minute (rpm).

6. The device of claim 1, wherein the flange is an integral part of the glass-based optical reflector.

7. The device of claim 1, further comprising a gap disposed between an inner diameter of the flange and the metal-based motor rotor body, wherein the gap has a pre-configured dimension to at least partially accommodate a mismatch of coefficients of thermal expansion (CTE) between the glass-based optical reflector and the metal-based motor rotor body.

8. The device of claim 7, wherein the gap is in the range of about 25-45 μm.

9. The device of claim 1, wherein:
the motor shaft is disposed in one or more bearings, wherein the one or more bearings are disposed in the metal-based motor rotor body.

10. The device of claim 1, wherein the glass-based optical reflector and the metal-based motor rotor body are substantially concentric with respect to the axis along the longitudinal direction of the motor shaft.

11. The device of claim 1 wherein the metal-based motor rotor body comprises at least one of aluminum, iron, copper, steel, or a metal alloy.

12. The device of claim 1, wherein the elastomer piece comprises an elastomer ring disposed between the clamping mechanism and the flange.

13. The device of claim 1, wherein the elastomer piece has a hardness in the range of about 40 A-75 A durometer; and wherein the elastomer piece has an inner diameter of about 32 mm, an outer diameter of about 44 mm, and a thickness of about 1.3-3 mm.

14. The device of claim 1, wherein at least one of a type or dimensions of the elastomer piece is selected to reduce the likelihood of glass fracturing caused by a mismatch of coefficients of thermal expansion (CTE) between the glass-based optical reflector and the metal-based motor rotor body.

15. The device of claim 1, wherein the first surface of the elastomer piece comprises a substantially flat surface.

16. The device of claim 1, wherein the second surface of the elastomer piece comprises a rugged surface.

17. The device of claim 1, wherein the elastomer piece comprises at least one of a polymer-based piece or a rubber-based piece.

18. The device of claim 17, wherein the elastomer piece comprises an ethylene propylene diene monomer (EPDM) based rubber.

19. The device of claim 1, wherein the clamping mechanism comprises a plurality of screws and a plurality of lock washers.

20. The device of claim 1, wherein the rotatable optical reflector device is operable in a temperature range of about −40° C. to 85° C.

21. The device of claim 1, further comprising:
a fairing disposed around the glass-based optical reflector, wherein the fairing comprises an opening and at least a portion of a cylinder or a cone; and wherein an axial direction of the fairing is substantially parallel to an axial direction of the glass-based optical reflector.

22. The device of claim 21, wherein the fairing is concentric with the glass-based optical reflector.

23. The device of claim 21, wherein the fairing is eccentric with the glass-based optical reflector.

24. The device of claim 1, further comprising:
an index encoder attached to the clamping mechanism; and
at least one of a Hall-effect sensor and motor windings.

25. A Light Detection and Ranging (LiDAR) system comprising a rotatable optical reflector device, the device comprising:
a glass-based optical reflector including a plurality of reflective surfaces and a flange;
a metal-based motor rotor body at least partially disposed in an inner opening of the glass-based optical reflector, wherein:
the flange extends from an inner sidewall of the glass-based optical reflector towards the metal-based motor rotor body, wherein the flange is not in contact with a motor shaft,
the flange includes a first mounting surface that is in contact with a reference surface of the metal-based motor rotor body, wherein an axis along a longitudinal direction of the motor shaft is substantially perpendicular to the reference surface of the metal-based motor rotor body;
an elastomer piece having a first surface and a second surface, the first surface of the elastomer piece being in contact with a second mounting surface of the flange, wherein the elastomer piece is not in contact with the motor shaft, and the elastomer piece is on top of the flange; and
a clamping mechanism compressing the elastomer piece at the second surface of the elastomer piece, wherein movement of the metal-based motor rotor body causes the glass-based optical reflector to optically scan light in a field-of-view of the LiDAR scanning system.

26. A motor vehicle comprising a Light Detection and Ranging (LiDAR) system, the LiDAR system comprising a rotatable optical reflector device, the device comprising:
a glass-based optical reflector including a plurality of reflective surfaces and a flange;
a metal-based motor rotor body at least partially disposed in an inner opening of the glass-based optical reflector, wherein:
the flange extends from an inner sidewall of the glass-based optical reflector towards the metal-based motor rotor body, wherein the flange is not in contact with a motor shaft,
the flange includes a first mounting surface that is in contact with a reference surface of the metal-based motor rotor body, wherein an axis along a longitudinal direction of the motor shaft is substantially perpendicular to the reference surface of the metal-based motor rotor body;
an elastomer piece having a first surface and a second surface, the first surface of the elastomer piece being in contact with a second mounting surface of the flange, wherein the elastomer piece is not in contact with the motor shaft, and the elastomer piece is on top of the flange; and a clamping mechanism compressing the elastomer piece at the second surface of the elastomer piece, wherein movement of the metal-based motor rotor body causes the glass-based optical reflector to optically scan light in a field-of-view of the LiDAR scanning system.

* * * * *